(12) United States Patent
Katsipoulakis et al.

(10) Patent No.: US 12,235,872 B2
(45) Date of Patent: *Feb. 25, 2025

(54) DISTRIBUTED DATABASE THAT USES HYBRID TABLE SECONDARY INDEXES

(71) Applicant: Snowflake Inc., Bozeman, MT (US)

(72) Inventors: Nikolaos Romanos Katsipoulakis, Redwood City, CA (US); Dimitrios Tsirogiannis, Belmont, CA (US); Zhaohui Zhang, Redwood City, CA (US)

(73) Assignee: Snowflake Inc., Bozeman, MT (US)

( * ) Notice: Subject to any disclaimer, the term of this patent is extended or adjusted under 35 U.S.C. 154(b) by 245 days.

This patent is subject to a terminal disclaimer.

(21) Appl. No.: 18/171,297

(22) Filed: Feb. 17, 2023

(65) Prior Publication Data

US 2023/0205785 A1 Jun. 29, 2023

Related U.S. Application Data

(63) Continuation-in-part of application No. 17/463,353, filed on Aug. 31, 2021, now Pat. No. 11,709,866.

(60) Provisional application No. 63/366,317, filed on Jun. 13, 2022, provisional application No. 63/233,097, filed on Aug. 13, 2021.

(51) Int. Cl.
*G06F 16/27* (2019.01)
*G06F 9/46* (2006.01)

(52) U.S. Cl.
CPC ............ *G06F 16/273* (2019.01); *G06F 9/466* (2013.01)

(58) Field of Classification Search
CPC ................................ G06F 16/273; G06F 9/466
See application file for complete search history.

(56) References Cited

U.S. PATENT DOCUMENTS

| | | | |
|---|---|---|---|
| 9,189,513 B1* | 11/2015 | Castellano | G06F 16/2272 |
| 11,256,515 B2* | 2/2022 | Kulkarni | G06F 9/30145 |
| 11,709,866 B2 | 7/2023 | Luo et al. | |
| 2014/0172898 A1* | 6/2014 | Aguilera | G06F 16/27 |
| | | | 707/759 |
| 2018/0357240 A1* | 12/2018 | Miller | G06N 5/022 |

(Continued)

OTHER PUBLICATIONS

"U.S. Appl. No. 17/463,353, Notice of Allowance mailed Mar. 2, 2023", 21 pgs.

*Primary Examiner* — Hares Jami
(74) *Attorney, Agent, or Firm* — Schwegman Lundberg & Woessner, P.A.

(57) ABSTRACT

The subject technology receives, by a distributed database, transactional queries against a key-value database comprising data managed by key-value pairs. The subject technology performs, using asynchronous threads of execution nodes of the distributed database, asynchronous transformation and compaction of key-value pairs of data that corresponds to the plurality of transactional queries. The subject technology performs, using asynchronous threads of execution nodes of the distributed database, asynchronous transformation and compaction of a set of secondary indexes that corresponds to the plurality of transactional queries. The subject technology processes, using transactional threads in the execution nodes, the plurality of transactional queries to generate results data, the asynchronous threads performing the asynchronous transformation and compaction while the transactional threads generate the results data.

30 Claims, 14 Drawing Sheets

(56) References Cited

U.S. PATENT DOCUMENTS

| | | | |
|---|---|---|---|
| 2021/0117443 A1* | 4/2021 | Zheng | G06F 16/273 |
| 2021/0124754 A1* | 4/2021 | Yang | G06F 16/28 |
| 2022/0217072 A1* | 7/2022 | Singhal | H04L 45/021 |
| 2023/0055715 A1 | 2/2023 | Luo et al. | |
| 2023/0325409 A1 | 10/2023 | Luo et al. | |

* cited by examiner

DISTRIBUTED DATABASE THAT USES HYBRID TABLE SECONDARY INDEXES

PRIORITY CLAIM

This application is a continuation-in-part of U.S. Non-Provisional patent application Ser. No. 17/463,353, filed on Aug. 31, 2021, which claims the benefit of priority of U.S. Provisional Patent Application No. 63/233,097, filed Aug. 13, 2021, and each of which is hereby incorporated by reference in its entirety for all purpose. This application claims the benefit of priority to U.S. Provisional Patent Application Ser. No. 63/366,317 filed Jun. 13, 2022, the contents of which are incorporated herein by reference in their entirety.

TECHNICAL FIELD

Embodiments of the disclosure relate generally to a network-based database system or a cloud data platform and, more specifically, to processing concurrent transactions to enable transactional processing and compaction of the transactional data in a scalable and performant manner within the database system.

BACKGROUND

Cloud-based data warehouses and other database systems and platforms sometimes provide support for transactional processing that enable such systems to perform operations that are not available through the built-in, system-defined functions. However, transactional processing of the data can rapidly grow, and it can be difficult to compact the data in a secure manner that does not affect accuracy or integrity of the data.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
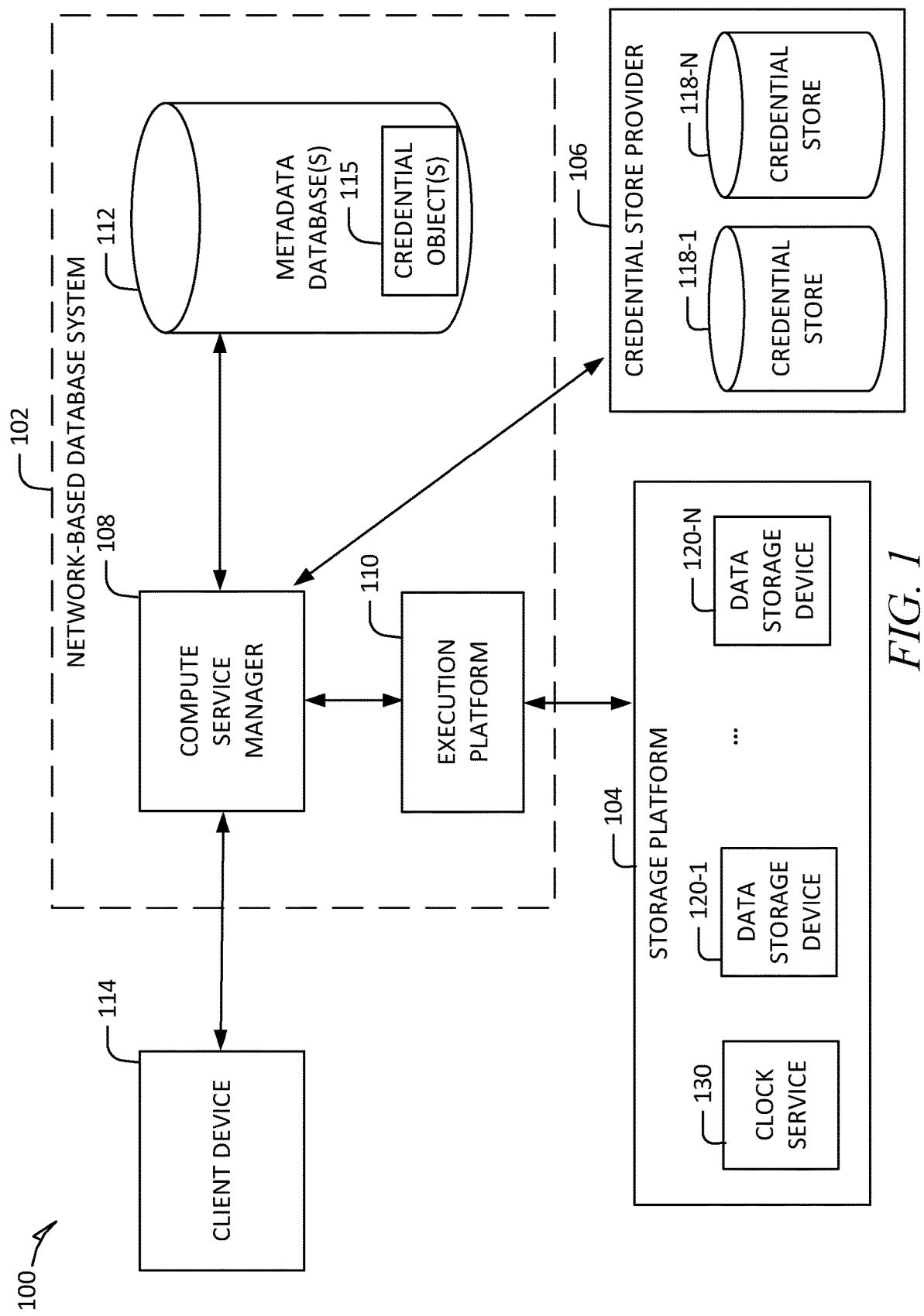
FIG. 1 illustrates an example computing environment that includes a network-based database system in communication with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In database systems, performing transactions on a given database can be supported. To facilitate that a given transaction is committed to a table, existing database systems can employ varying approaches including Online Transactional Processing (OLTP) techniques. As discussed herein, OLTP refers to a category of data processing that involves transaction-oriented tasks. In an example, OLTP involves inserting, updating, and/or deleting varying amounts of data in a given database. OLTP can deal with large numbers of transactions by a large number of users. Increasingly, such transactions are implemented by users that are working in a distributed and networked environment from varying locations and computing environments. Thus, it is also increasingly important to ensure such transactions execute and complete in a concurrent manner that protects the integrity and consistency of the data in such a distributed environment.

As described herein, a database system provides concurrency control and isolation for executing a series of query statements (e.g., Structured Query Language (SQL) statements) within a transaction against a linearizable storage. In particular, the database system herein employs a concurrency control mechanism that is a combination of a multi-version concurrency control for read operations (MVCC) and locking for write operations. Additionally, the database system implements a targeted isolation level (e.g., snapshot isolation), where each statement can execute against a different snapshot of a database, and write locks are held until a transaction commit.

The database system, in an embodiment, implements a two-level transaction hierarchy, where a top-level transaction corresponds to a SQL transaction, and a nested transaction corresponds to a SQL statement within the parent SQL transaction. A given nested transaction can perform read and write operations, and can perform a rollback and restart execution zero or more times before succeeding. Upon transaction commit, write operations can become visible, and write locks held by each contained statement can be released.

Further, embodiments of the database system address deadlock detection and resolution for databases. Advantageously, the database system avoids false positives where only transactions involved in a deadlock will be aborted. This is helpful for users to find deadlocks in their application code so that deadlocks can be fixed. In addition, the database system implements embodiments of distributed deadlock detection without a centralized transaction manager. In an example, this is desirable for distributed databases, where each transaction is executed by a separate job, so that the coordination among different jobs/nodes are minimized.

In some example embodiments, the database system does not remove data from the underlying data store, and a separate compactor is implemented to perform compaction. The compaction can track an oldest transactions' read time stamp, and then periodically sweep the database (e.g., Foundation Database (FDB)) to find "dead" versions of the objects. In some example embodiments, the compactor is also published in the database to enable in-progress statements to remove dead versions of the object as part of normal online execution. In some example embodiments, the compactor sweeps for objects that may be deleted and can further rewrite the objects to contain their commit timestamps instead of their transaction ID, thereby enabling compaction of transaction status table, as discussed below, and further avoiding network overhead (e.g., checking the transaction status table for the commit result and timestamp) for subsequent reads and writes of subsequent queries, which significantly increases the performance of the subsequent queries and reduces the memory usage. For example, a subsequently received query can read the transaction status directly when reading the query data, instead of performing additional reads (e.g., from a status table).

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the network-based database system 102 in communication with a cloud storage platform 104 (e.g., AWS®, Microsoft Azure Blob Storage®, or Google Cloud Storage), and a cloud credential store provider 106. The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device.

As another example, a metadata database 112 can store one or more credential objects 115. In general, a credential object 115 indicates one or more security credentials to be retrieved from a remote credential store. For example, the credential store provider 106 maintains multiple remote credential stores 118-1 to 118-N. Each of the remote credential stores 118-1 to 118-N may be associated with a user account and may be used to store security credentials associated with the user account. A credential object 115 can indicate one of more security credentials to be retrieved by the compute service manager 108 from one of the remote credential stores 118-1 to 118-N(e.g., for use in accessing data stored by the storage platform 104).

The compute service manager 108 is further coupled to the execution platform 110, which provides multiple computing resources that execute various data storage and data retrieval tasks. The execution platform 110 is coupled to storage platform 104 of the cloud storage platform 104. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid state drives (SSDs), storage clusters, Amazon S3™ storage systems, or any other data storage technology. Additionally, the cloud storage platform 104 may include distributed file systems (such as Hadoop Distributed File Systems (HDFS)), object storage systems, and the like.

As further shown, the storage platform 104 includes clock service 130 which can be contacted to fetch a number that will be greater than any number previously returned, such as one that correlates to the current time. Clock service 130 is discussed further herein below with respect to embodiments of the subject system.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-Networks) coupled to one another. In alternative embodiments, these communication links are implemented using any type of communication medium and any communication protocol.

The compute service manager 108, metadata database(s) 112, execution platform 110, and storage platform 104, are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks (or transactions as discussed further herein) and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
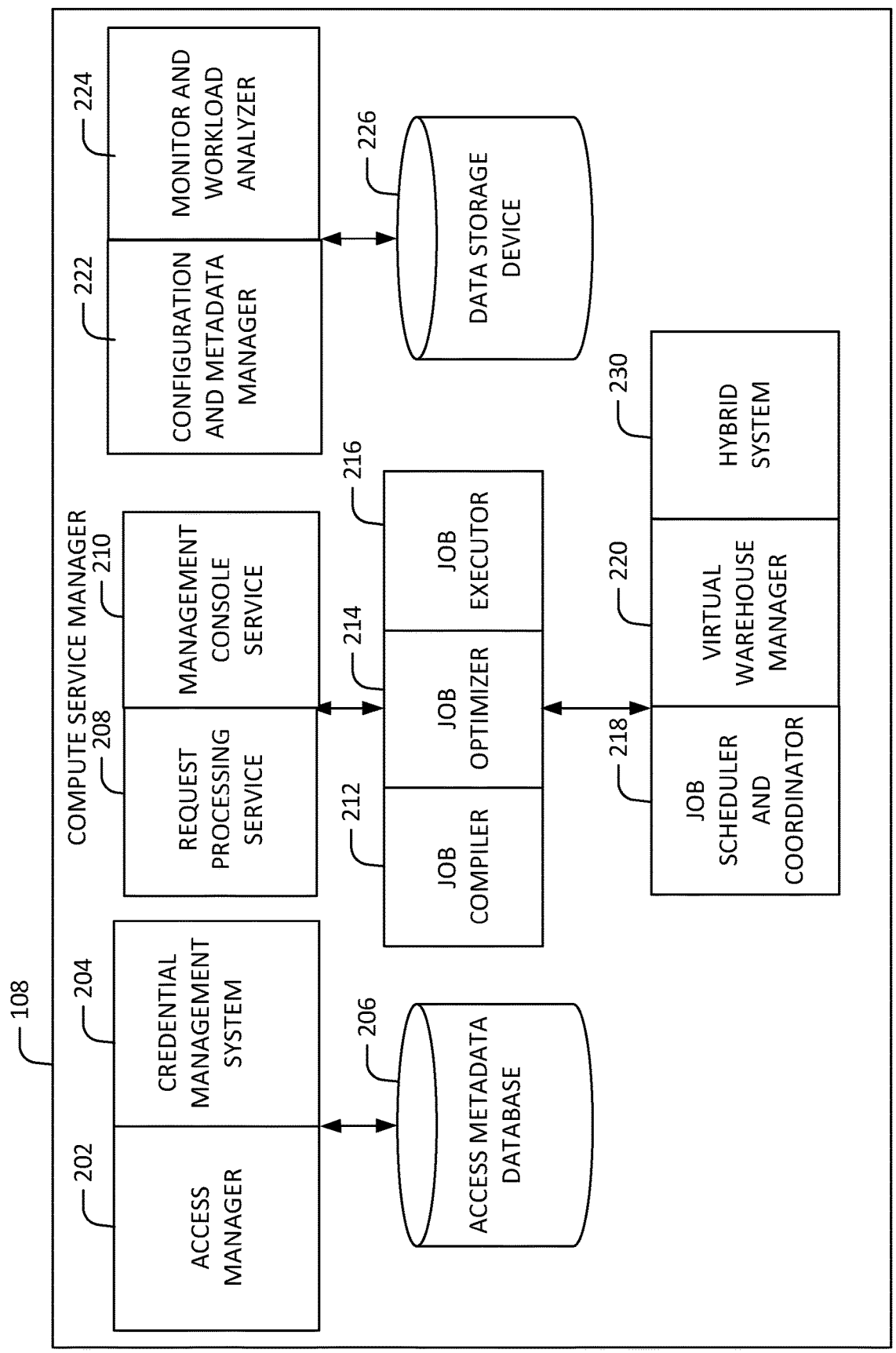
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates use of remote stored credentials (e.g., credentials stored in one of the remote credential stores 118-1 to 118-N) to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store (e.g., one or more of the remote credential stores 118-1 to 118-N) and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database (e.g., the storage platform 104) but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversee processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

Figure 3:
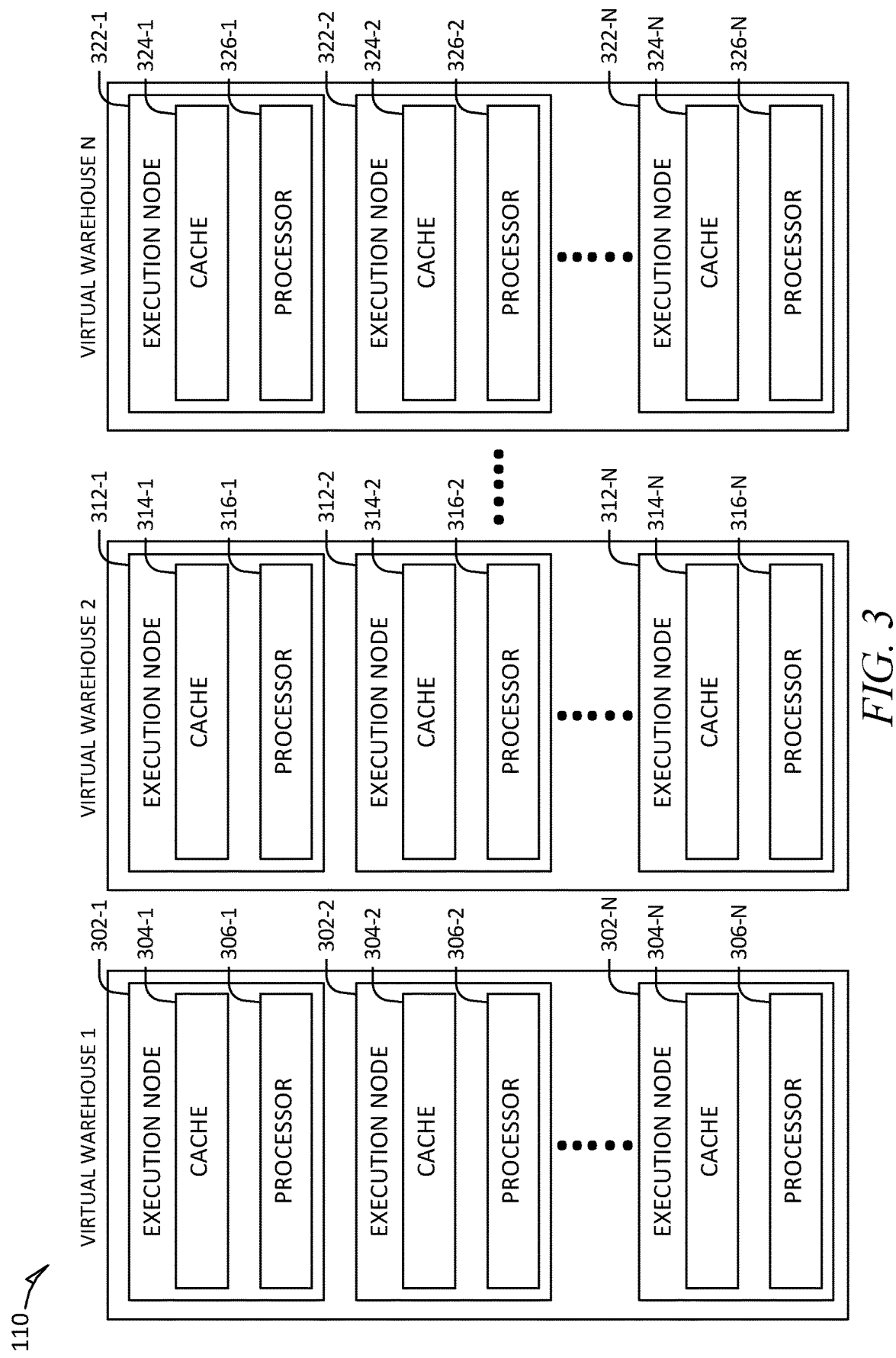
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
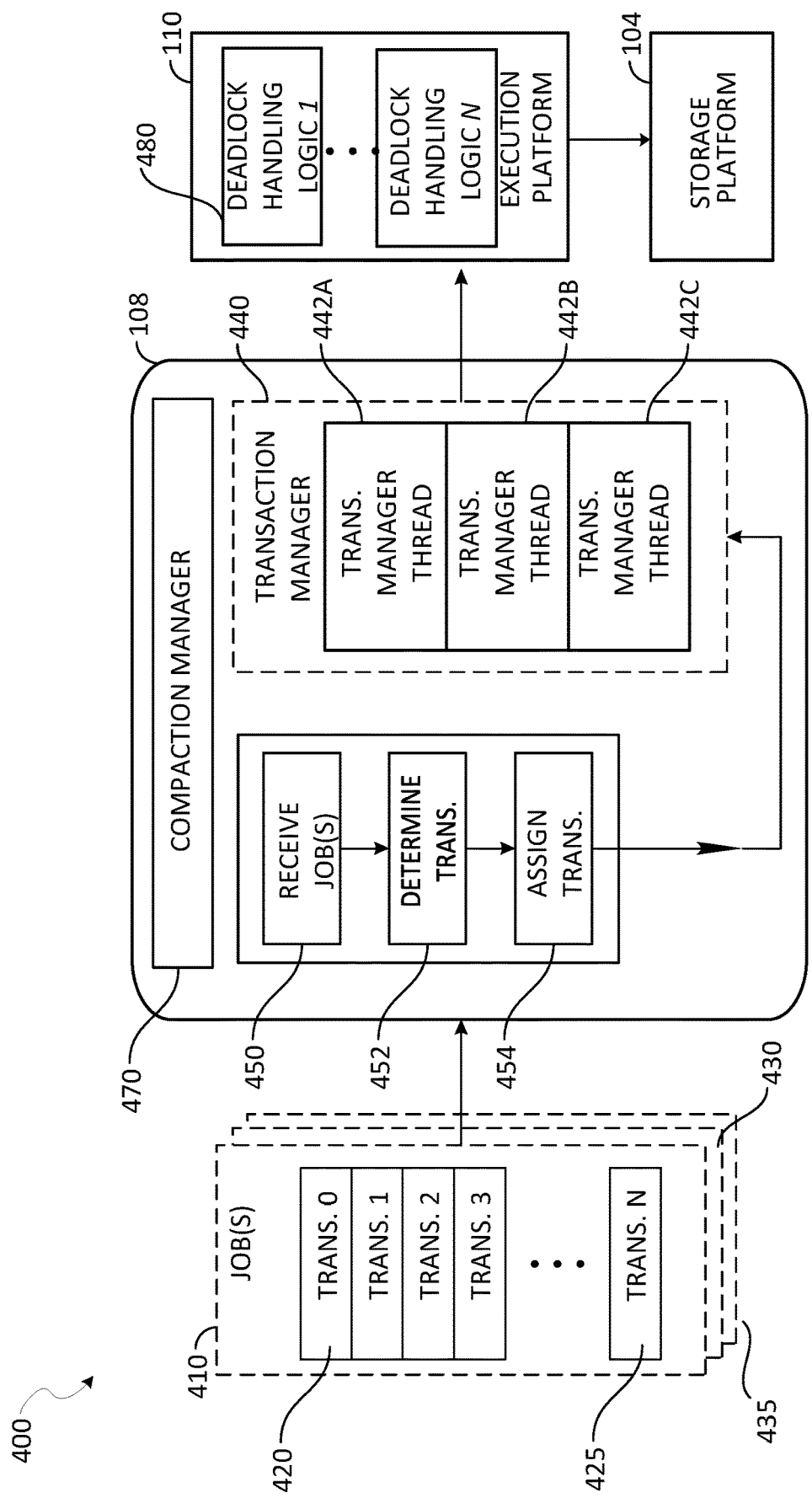
FIG. 4 is a computing environment conceptually illustrating an example software architecture for managing and executing concurrent transactions on a database system, which can be performed by a given execution node of the execution platform, in accordance with some embodiments of the present disclosure.

FIG. 4 is a computing environment 400 conceptually illustrating an example software architecture for managing and executing concurrent transactions on a database system (e.g., the network-based database system 102), which can be performed by a given execution node of the execution platform 110, in accordance with some embodiments of the present disclosure. In an embodiment, a process flow is performed by a transaction manager that is configured to manage and execute transactions as described further herein.

As shown, the transaction manager 440 is included in the compute service manager 108. The transaction manager 440 receives a job 410 that may be divided into one or more discrete transactions 420-425, e.g., transaction 0, transaction 1, transaction 2, transaction 3, and so forth through transaction (n). In an embodiment, each transaction includes one or more tasks or operations (e.g., read operation, write operation, database statement, user defined function, and the like) to perform. The transaction manager 440 receives the job at 450 and determines transactions at 452 that may be carried out to execute the job 410. The transaction manager 440 is configured to determine the one or more discrete transactions, such as transaction 0, transaction 1, transaction 2, transaction 3, and so forth, based on applicable rules and/or parameters. The transaction manager 440 assigns transactions at 454.

As further shown, the transaction manager 440 is configured to concurrently process multiple jobs that can be performed by the execution platform 110. In an example, the transaction manager 440 can receive a second job 430 or a third job 435, each of which include respective discrete transactions that are to be performed on the execution platform 110. Each of the transactions may be executed concurrently by the execution platform 110 in which different operations are performed (e.g., a respective read operation or write operation are executed from each of the transactions by the execution platform 110).

In an implementation, the job 410, including the respective transactions therein, is carried out by the transaction manager 440 which can perform the responsibilities of a query manager (e.g., processing query statements and operations, and the like). As shown, the transaction manager 440 may have multiple threads, including, for example, transaction manager threads 442A, 442B, 442C, and so forth. The transaction manager 440 may assign the job 410, including the multiple discrete transactions, to a particular virtual warehouse of the execution platform 110. Based on this assignment, the transaction manager 440 can send the job 410, including the multiple discrete transactions, to the assigned virtual warehouse for execution. Alternatively, the transaction manager 440 can send a subset of the transactions included in the job 410 for execution by the execution platform 110.

In an embodiment, as described further herein, the transaction manager 440 can perform operations to process transactions (e.g., OLTP) that may be executing concurrently, while handling conflicts and avoiding starvation of resources. Further, as described further herein, the transaction manager 440 handles conflicts between multiple transactions and concurrency issues that can arise when multiple transactions are executing in parallel on the execution platform 110. As further shown, the execution platform 110 communicates with the storage platform 104, which provides a distributed database (e.g., Foundation Database (FDB), and the like), where data can be read and written in connection with performing the transactions.

In an embodiment, the transaction manager 440 schedules and manages the execution of transactions on behalf of a client account. The transaction manager 440 may schedule any arbitrary SQL query included in a given transaction. The transaction manager 440 may assume a role to schedule the job 410 as if it is the client account rather than as an internal account or other special account. The transaction manager 440 may embody the role of, for example, an account administrator or a role having the (smallest) scope necessary to complete the job 410. In an embodiment, the transaction manager 440 embodies the role that owns the object that is the target of the job 410 (e.g., for a cluster, the table being clustered is the target).

In an embodiment, the transaction manager 440 determines transactions at 452 and assigns transactions at 454 that are to be performed to fully execute the job 410. In an embodiment, the transaction manager 440 assigns ordering constraints to any number of the one or more discrete transactions, where applicable. Depending on the constraints of the job 410, the transaction manager 440 may determine that one or more of multiple discrete transactions are to be serialized and executed in a particular order.

In an embodiment, the transaction manager 440 generates a report indicating when the job 410 is scheduled to be executed and how much computing resources are estimated to be tied up executing the job 410. The transaction manager 440 may alert a client account when the job 410 is being executed.

The database system provides concurrency control and isolation for executing transactions against (e.g., a series of SQL Statements within a SQL Transaction) against linearizable storage (e.g., a linearizable key-value store, NoSQL database, an OLAP database or data warehouse). A transaction as referred to herein includes a group of operations executed atomically. In an example, such transactions may include read and write operations but can also include operations such as increment, decrement, compare-and-swap, and the like. Further, it is appreciated that linearizable storage may include any type of distributed database (e.g., Apache HBase).

The following discussion relates to transactions in a given distributed database system. In an example, the transaction manager 440 utilizes a linearizable storage, provided by the storage platform 104, for managing and processing transactions as described herein. In an embodiment, the transaction manager 440 implements a read committed model for performing transactions. As referred to herein, a read committed model can refer to a model that ensures that all read operations performed in a given transaction sees a consistent snapshot of the database (e.g., reading a last set of committed values that existed when the read operation commenced), and the transaction itself successfully commits only if no updates that the transaction has made results in write-write conflicts with any concurrent transactions.

As discussed further herein, the transaction manager 440 implements a two-level transaction hierarchy, where a top-level transaction corresponds to a SQL transaction, and a nested transaction corresponds to a SQL statement within the parent SQL transaction. A given nested transaction can perform operations, such as reads and writes, and can perform a rollback and restart execution zero or more times before succeeding. Upon transaction commit, write operations can become visible, and write locks held by each contained statement can be released.

As mentioned before, the subject system provides concurrency control and isolation for executing a series of SQL Statements within a SQL Transaction against a linearizable storage. As discussed further herein, a transaction manager (e.g., transaction manager 440) is configured to provide a concurrency control mechanism that can be understood as a combination of multi-version concurrency control for read operations (MVCC) and locking for write operations. The subject system provides techniques for read committed isolation where each statement may execute against a different snapshot of the database (e.g., the storage platform 104), with write locks held until transaction commit.

In an embodiment, the linearizable storage as described herein enables each operation to execute atomically between invocation and response. As an example, such a linearizable key-value store ensures that operations execute in an atomic manner consistent with a "real-time" ordering of those operations e.g., when operation A completes before operation B begins, operation B should take effect after operation A. In the context of a database, a first write operation to a row in the table takes effect before a second write or read operation to the same row in the table if the second operation was issued after the first completed.

The examples described herein relate to linearizable storage such as a linearizable database, including, for example, NoSQL systems, and the like. A given NoSQL database refers to a database that stores data in a format other than a tabular format, and can store data differently than in relational tables. Further, Uber's Schemaless is an example of building linearizable Key-Value storage via having a "key" and "value" column in a relational table. Other examples of linearizable databases are: HBase, RocksDB, TiKV, Redis, Etcd.

Some examples of optimizations provided by the subject system include utilizing restricted transactional capabilities offered by some embodiments of storage platform 104, such as FoundationDB, that can be leveraged to enable a more efficient transaction implementation. For example, in a write (/lock/delete) protocol, a write operation is performed, and then a read operation is done to check for (1) any write operation that happened before the write request was submitted (2) any other write operation was submitted concurrently with the write operation that was serialized before. The following example illustrates the above:

T1 starts statement S1

S1 starts a FoundationDB Transaction, and uses its Read Version as the Read Timestamp S1 wishes to write object X, so it first reads object X as of the Read Timestamp Finding no conflicts, S1 writes X, using a timestamped operation to embed the commit timestamp in the key and setting IsCommitEmbedded.

S1 sets a read conflict range on the FoundationDB transaction for all keys with a prefix of X S1 writes a transaction status entry for ID, directly setting it to committed.

T1 commits the FoundationDB Transaction.

If the transaction commits, then there were no concurrent conflicting transactions.

If the transaction is aborted, then there was a concurrency conflicting transaction for one of the writes that were done. None of S1's writes, nor the transaction status entry will be persisted. S1 now restarts in the slow path.

In an example, a "read version" refers to a "version" or state of the database that corresponds to when a last operation was successfully committed to the database.

The following relates to a discussion of strict serializability. Whereas linearizability makes a "real-time" ordering and atomicity promise about single operations, strict serializability makes a "real-time" ordering and atomicity promise about groups of operations. In an example, the group of operations is submitted incrementally over time, with a terminal "commit" command being issued. The strictly serializable storage platform may employ techniques such as pessimistic lock-based exclusion or an optimistic validation phase to enable this functionality. In this example, the group of operations is referred to as a transaction as mentioned herein. The subject system can impose restrictions on the transaction, such as the number, size, or duration of the operations, and always reject transactions that exceed these limits.

In an embodiment, read operations may be optimized in the following manner. When reading with a given read timestamp, it may not be feasible for any transaction started after the read timestamp to commit before the read timestamp. Thus, if the Transaction ID is set to be the same as the first statement's read timestamp, then instead of reading [X.0, X.inf], the subject system can read [X.0, X.readTimestamp]. Consequently, this approach can make read operations for old or frequently written data more efficient.

In an embodiment, the subject system implements a two-level transaction hierarchy, where the top-level transaction corresponds to a SQL Transaction, and the nested transaction (referred to as a "StatementContext") corresponds to a SQL statement within the parent SQL Transaction. A given StatementContext performs read and write operations and may be instructed to perform a rollback and restart execution zero or more times before succeeding. In an example, transactions control the collective visibility of all write operations from successful statements. Upon transaction commit, all write operations become visible, and all write locks held by each contained statement are released.

In an embodiment, each object key is associated with a stamp that uniquely identifies a single execution attempt of a statement, which can be by appending a three-part tuple of (Transaction ID, statementNumber, restartCount). The higher order component is the transaction identifier assigned to the SQL-level transaction. The statementNumber identifies the SQL statement within the SQL-level BEGIN/COMMIT block. The restart count tracks which statement restart attempt generated this write operations. A StatementContext is instantiated with this stamp, and applies it to all writes performed through the StatementContext instance.

Stamping keys this way has a number of desirable properties. First, if key1<key2, then key1.suffix1<key2.suffix2, regardless of the values of suffix1 and suffix2. If key1==key2, then the transactionID component of the suffix allows us to resolve the commit status of the object to determine its visibility to the statement. If transactionID1==transactionID2, then Statement Number allows statements to see writes performed by previous statements within the same transaction. The restartCount component of the suffix enables the system to detect and delete obsolete versions of the object that had been left around when a statement has to be restarted.

In a similar fashion each execution of a statement is given a three-part identifier consisting of the statement's readTimestamp (RTS) and the current values of statementNumber (SN) and restartCount (RC). This approach ensures that each statement that is part of the execution of a SQL statement (or more generally a SQL Transaction), sees either data committed before the SQL statement started or by data written or updated by the transaction itself.

In an embodiment, the transaction manager employs a Transaction Status Table (TST) to keep track of committed and aborted transactions. The TST is a persistent hashmap that maps Transaction ID to its metadata, most notably a list of finalized statement numbers and their final restart count, and the commit outcome including the transaction's commit timestamp (CTS). Transactions that are in progress do not exist in the Transaction Status Table. In an embodiment, the TST can be stored in the storage platform 104, or within memory or cache of the execution platform 110.

The following discussion relates to a read protocol that is utilized by the transaction manager 440.

In an embodiment, the transaction manager 440 uses a read committed transaction isolation level, and each statement may be run with a different read timestamp. In an example, the read request for a given key (or a range of keys) is implemented by executing a linearizable storage read call for all keys with X as their prefix. The call returns versions of X with their stamps and values. The read method returns either the latest version of X made by a transaction that committed before the SQL statement started or which was written by the most recent statement of the transaction itself that was not canceled (if any).

The following discussion relates to a write protocol that is utilized by the transaction manager 440.

In an embodiment, the write protocol checks both for WW (write-write) conflicts and WW deadlocks. The following example describes a single transaction and no conflicts.

Assume that object X initially has a stamp of TXN1.0.0 and was committed at timestamp 10. In the following example, it should be understood that the following transactional steps described further below can be done within one transaction, and collectively committed. On failure, or upon exceeding the limitations of the underlying transactional system, the execution can fall back to issuing the operations individually as described in further detail below.

T2 starts and creates S1 of StatementContext(ID=TXN2, Statement Number=1, restartCount=0)

Assume that the constructor obtains a read timestamp from the linearizable storage of 15 by contacting the clock service 130. As mentioned before, the clock service 130 is a component of the storage platform 104 which can be contacted to fetch a number that will be greater than any number previously returned, such as one that correlates to the current time. In an embodiment, clock service 130 is provided separately and is independently contactable from the linearizable storage, or can be integrated into the linearizable storage such that the clock value may be inserted into a written value. The latter operation will be referred to as a timestamped write.

To update value of X, the following sequence of actions is performed in an embodiment:

```
{
  S1 does a linearizable storage write for X.TXN2.1.0 with a value of 100
  // The next step is for S1 to check for WW (write-write) conflicts by
  checking whether there is
  // another transaction that has updated X
  between the RTS and S1's write.
  S1 issues the range read [X.0, X.inf]
  to obtain the set all versions of X and
  their stamps
  The read returns [X.TXN1.0.0, X.TXN2.1.0].
  S1 looks up TXN1 in the Transaction Status Table, finds a commit
  timestamp of 10.
  10 is earlier than our read timestamp of 15, so it is not a conflict.
  S1 ignores [X.TXN2.1.0] as it belongs to S1
  // Assume for now, there were no conflicts detected
  S1 finalizes, and records (statement number=1,
  restart count=0) into the
  transaction
  status table for TXN2
}
```

T2 commits. This will cause the Transaction Status Table record to be updated in linearizable storage to reflect that TXN2 is now committed and its commit timestamp of 20.

At this point there will be two versions of X, one stamped with TXN1.0.0 and the other TXN2.1.0. Subsequent transactions that read X can determine if this new version of X was written by a committed transaction by reading the transaction status record, and determine the CTS of the transaction.

The write protocol for transaction T can now be stated.

In an implementation, each row (object) updated uses two separate linearizable storage transactions:
1) The first linearizable storage transaction of T inserts a new version of the object with its key X suffixed with three-part suffix (T.ID, T.statementNumber, T.restartCount).
2) The second linearizable storage transaction issues a range read with the prefix "X." to obtain the SCT (set of conflicting transactions). The result set is a list of committed or active transactions that wrote (or are writing) new versions of X.

There are a number of possible distinct outcomes to this linearizable storage read call that are evaluated in the following order:

1) SCT is empty in which case T is trivially allowed to proceed.
2) SCT is not empty, but for all Ti in SCT, Ti has committed before T's read timestamp, and thus are not WW (write-write) conflicts. T may proceed.
3) SCT is not empty; for all Ti in SCT, Ti is committed; and there exists a Ti in SCT, such that its CTN is greater than T's read timestamp. T is permitted to restart without delay.
4) SCT is not empty, and for one or more Ti in SCT, Ti has not yet committed or aborted. T waits for all transactions in SCT to complete before restarting the current statement.
5) SCT is not empty, and for one or more Ti in SCT, Ti.TransactionID is the same as our own transaction ID, and Ti.StatementCount is less than our current statement count. This means that currently the lock is held, as a previous statement took it and successfully finished its execution. T may proceed.
6) SCT is not empty, and for one or more Ti in SCT, TI.TransactionID is the same as our own transaction ID, Ti.StatementCount is the same as our own StatementCount, and Ti.RestartCount is less than our own restart count. This is a lock from a previous execution of our own transaction, thus T holds the lock on this row, and T may proceed.

For all cases, the object (X.Stamp, Value) will be left in the database (e.g., the storage platform 104). For (3) and (4) which require restarts, the object is left to serve as a write lock. In general, all tentative writes for an object X will form a queue of write locks. (5) and (6) illustrate the cases where previously left write locks allow subsequent statements or restarts of a statement to recognize that they already hold the lock that they wish to take.

The following discussion describes an example that illustrates a write-write (WW) conflict. A write-write conflict, which is also understood as overwriting uncommitted data, refers to a computational anomaly associated with interleaved execution of transactions. To simplify the example, stamps are omitted. Assume that before either T1 or T2 starts that object X has a value of 500, a stamp of TXN1.0.0, and a CTN of 10.

T1 starts and gets a read timestamp of 15
T2 starts and gets a read timestamp of 20
T2 writes (key=X.T2, value=100)
T2 issues a linearizable storage read with range [X.0, X.Inf]. The set SCT will be empty so T2 continues
T1 writes (key=X.T1, value=50)
T1 issues a linearizable storage read with range [X.0, X.Inf]. The set SCT will contain T2 so T1 must restart
T2 successfully commits. T1's CTN for X will be >20. Assume it is 21
After waiting until T2 either commits or aborts, T1 restarts the statement with a read TS>21.

The following discussion relates to a delete protocol utilized by the transaction manager 440.

In an embodiment, delete operations are implemented as a write of a sentinel tombstone value; otherwise, delete operations employ the same protocol as write operations. When a read operation determines that the most recently committed key is a tombstone, it considers that key to be non-existent.

The following discussion relates to a lock protocol utilized by the transaction manager 440.

To support a query statement of SELECT . . . FOR UPDATE, the transaction manager API offers StatementContext::lock(Key), which allows rows to be locked without writing a value to them. The implementation of lock( ) follows the write protocol, except that it writes a special sentinel value to indicate the absence of a value (distinct from SQL NULL). A SELECT . . . FOR UPDATE statement may also be forced to restart several times before the statement finishes successfully. Once it does, subsequent statements in the transaction will recognize the existence of this key as an indication that they hold the lock (in accordance with cases (5) and (6) above). All reads can ignore the key as a write.

The following discussion relates to determining whether to commit, abort, or restart a given transaction which can be determined by the transaction manager 440.

When a transaction finishes its execution, it will either have an empty SCT, indicating that the commit can proceed, or an SCT with one or more conflicting transactions, indicating that the transaction will need to restart.

When a statement is restarted, all writes stamped with a lower restartCount are left in the database (e.g., the storage platform 104) as provisional write locks for the next execution. The next execution of the statement might write a different set of keys. The set difference between the first and second execution form a set of orphaned writes that are removed and never become visible. The statement itself may not be relied upon to always be able to clean up its own orphaned writes, as in the event of a process crash, the location of the previous writes will have been forgotten. Finalizing statements and recording the restart count of the successful execution promises that only the results of one execution will ever become visible, and permits orphaned writes to be lazily cleaned up.

A transaction is committed, and all of its writes made visible, by inserting its Transaction ID into the Transaction Status Table. The commit timestamp is filled in by the clock service 130 or directly by the distributed database (e.g., FoundationDB), such that it is higher than any previously assigned read or commit timestamps. All writes are completed before a statement may be finalized, and all statements are finalized before the transaction may be committed.

A transaction is aborted by inserting its Transaction ID into the Transaction Status Table, with its transaction outcome set as aborted. The list of finalized statements and their restart counts will be reset to an empty list. The insertion into the Transaction Status Table will make the abort outcome visible to all conflicting transactions, and all writes performed by finalized statements may be proactively or lazily removed from the database (e.g., the storage platform 104).

When a statement tries to finalize with a non-empty SCT, it waits for commit outcomes to be persisted to the Transaction Status Table for all conflicting transactions. Once all conflicting transactions have committed or aborted, then the transaction will begin its restart attempt.

The following discussion relates to an API (e.g., the transaction manager API as referred to below) that can be utilized (e.g., by a given client device) to send commands and requests to the transaction manager 440.

A SQL transaction contains a sequence of one or more SQL statements. Each SQL statement is executed as a nested transaction, as implemented by the transaction manager StatementContext class. Each transaction manager statement itself is executed as one or more database transactions.

In an embodiment, the transaction manager API is divided into two parts: 1) the data layer, which provides a read and write API to the transaction execution processes; and 2) the transaction layer, which provides, to the compute service manager 108, an API to orchestrate the transaction lifecycle.

In an implementation, transactions operate at a READ COMMITTED isolation level and implement MVCC on top of the distributed database (e.g., storage platform 104) to avoid taking any read locks.

Consider the following example SQL query:

Update$emp$.Salary=$emp$.Salary*1.1where $emp$.Dept="shoe";

In an example, an instance of the StatementContext class will be created to execute this SQL statement. The constructor contacts the linearizable storage transaction manager to begin a linearizable storage transaction and obtain a linearizable storage STN which is then stored in the readTimestamp variable.

The Update operation then executes across any number of execution nodes, all using the same StatementContext instance. In an example, a function rangeRead( ) will be used to scan the base table, or an index on Dept, for the tuples to update. A series of write( ) calls will be made to update the salary of all matching employees.

A call to finalize( ) will return CONFLICT if the statement encountered any conflicts during its execution, to indicate that re-execution is needed. The key to restarts making progress is that the first execution of the statement will have the side effect of, in effect, setting write locks on the objects being updated. This ensures that when the statement is re-executed the necessary writes locks have already been obtained and the statement will generally (but not always).

Next, consider an example illustrating Write-Write conflicts between 3 transactions:

T1 starts S1 with timestamp 10
T2 starts S2 with timestamp 20
T3 starts S3 with timestamp 30
S1 writes X
S2 writes Y
S3 writes Z
S1 writes Y, and notes the conflict with T2
S2 writes Z, and notes the conflict with T3
S3 writes X, and notes the conflict with T1

In this case described above, three transactions are involved in a deadlock. Each statement believes that it should restart and wait for the execution of the previous transaction to finish. No transaction has the complete information to know that it is involved in a deadlock.

Thus, when a statement fails to finalize due to conflicts, it instead writes its conflict set into the database (e.g., the storage platform 104). These conflict sets may be read by all other transactions, allowing them to detect a cycle in the waits-for graph, indicating that they're involved in a deadlock.

In database systems, a deadlock can refer to a situation where two or more transactions are waiting for one another to give up locks. As an example, deadlocks can be handled by deadlock detection or prevention in some embodiments. The following discussion relates to example mechanisms for handling deadlocks utilizing distributed approaches that do not require a centralized deadlock handling component or implementation. For example, in an implementation, a particular execution node, (e.g., execution node 302-1 and the like) in the execution platform 110 can perform at least some of the following operations described below.

Deadlock detection: A basic idea of deadlock detection is to detect a deadlock after the deadlock occurs such that that a particular transaction can be aborted. This can be done by finding cycles in a wait-for graph. Depending on how deadlock detection is performed, deadlock detection can be classified as:

Online detection: whenever a transaction wishes to acquire a lock, it adds an edge to the wait-for graph. The transaction is aborted if this new edge will cause a cycle.

Offline detection: the system periodically collects the pending lock requests from all transactions to construct a wait-for graph and perform cycle detection.

Deadlock prevention: A basic idea of deadlock prevention is to enforce some restrictions on locking so that deadlocks can never happen. Example techniques include:

Timeout: a transaction is assumed to be involved in a deadlock if its lock request cannot be granted after a certain time period, e.g., 5 seconds.

Non-blocking 2PL: whenever a conflict happens, a transaction is aborted immediately.

Wait-die: when a transaction Ti requests a lock that is held by Tj, Ti is only allowed to wait if Ti is older than Tj. Otherwise Ti is aborted immediately.

Wound-wait: when a transaction Ti requests a lock that is held by Tj, Tj is aborted if Ti has a higher priority than Tj. Otherwise, Ti will wait.

In embodiments, the database system implements a distributed database (e.g., storage platform 104) for executing distributed transactions, and utilizes locking for concurrency control where any deadlocks are handled in a distributed manner by a particular execution node executing a particular transaction (e.g., execution node 302-1 and the like).

In some embodiments, the database system provides the following:

No false deadlocks: Deadlocks generally represent some bugs in the user's application code. By providing accurate and informative deadlock information, embodiments of the database system enables a user to fix these deadlocks.

Distributed/decentralized deadlock handling: transaction manager 440 is designed for executing distributed transactions in the cloud. In an embodiment, the transaction manager 440 creates one job (with one or more execution node workers) to execute a transaction. It can be desirable that each transaction handles deadlocks independently without requiring a centralized transaction manager.

The following discussion describes a deadlock detection and resolution protocol for the database system to meet the two aforementioned requirements. In order to meet the goal of no false deadlocks, the database system performs deadlock detection on the wait-for graph and only aborts a transaction if it finds a cycle in the graph. To meet a goal of not utilizing a centralized transaction manager, each transaction (e.g., executing on a given execution node) are able to exchange wait-for information and perform deadlock detection independently. Further, the database system implements a deadlock detection algorithm that is deterministic so that all transactions can unanimously agree on which transactions to abort.

In the following discussion, it is understood that statements in a transaction are executed serially e.g., one at a time. As discussed further below, the database system can then extend a deadlock detection protocol as described herein to support parallel statement execution.

In the discussion below, "transaction" and "statement" are used interchangeably because it is assumed that statements of a transaction will be executed serially, e.g., one at a time. In an example, the database system utilizes a deadlock detection and resolution protocol that enables transactions to store their wait-for information into a dedicated table in a distributed database (e.g., storage platform 104). A transaction waiting for conflicting transactions can periodically run a deterministic deadlock detection algorithm. If a transaction determines that it is a victim in a deadlock, the transaction can abort itself so that other transactions can proceed.

In some implementations, the execution platform 110 can provide deadlock handling logic 480 (e.g., deadlock handling logic 1 to deadlock handling logic N, which can correspond respectively to each transaction 420 to transaction 425) which implements the deadlock detection and resolution protocol mentioned herein, and is provided or utilized by each given execution node that is currently executing a given transaction(s). In another embodiment, each deadlock handling logic can be provided to a corresponding transaction (or statement within a transaction) for deadlock detection and resolution as described further herein.

In an embodiment, wait-for information of transactions is stored in a wait-for table in the distributed database (e.g., storage platform 104). The wait-for table includes a set of key-value pairs where both keys and values are transaction IDs. A key-value pair <Ti, Tj> means that Ti is currently waiting for Tj, e.g., there is an edge Ti→Tj in the wait-for graph.

In order to satisfy the deterministic requirement, each transaction Ti reports Ti→Tj only if Tj is the oldest conflicting transaction that Ti is waiting for (a transaction's age is determined by its transaction ID, e.g., a younger (e.g., newer) transaction will have a larger transaction ID). By ensuring that there is at most one ongoing edge from each transaction, it is straightforward to see that each transaction can participate in at most one cycle. Thus, the youngest transaction (with the largest transaction ID) can be aborted in each cycle to deterministically resolve deadlocks.

In some example embodiments, the compute service manager 108 further comprises a compaction manager 470 that is configured to compact, transform, and remove key pairs. For example, the compaction manager 470 can implement a dedicated compactor and one or more online asynchronous compactors on execution nodes of the execution platform 110, as discussed in further detail below with reference to FIGS. 8 and 9.

Figure 5:
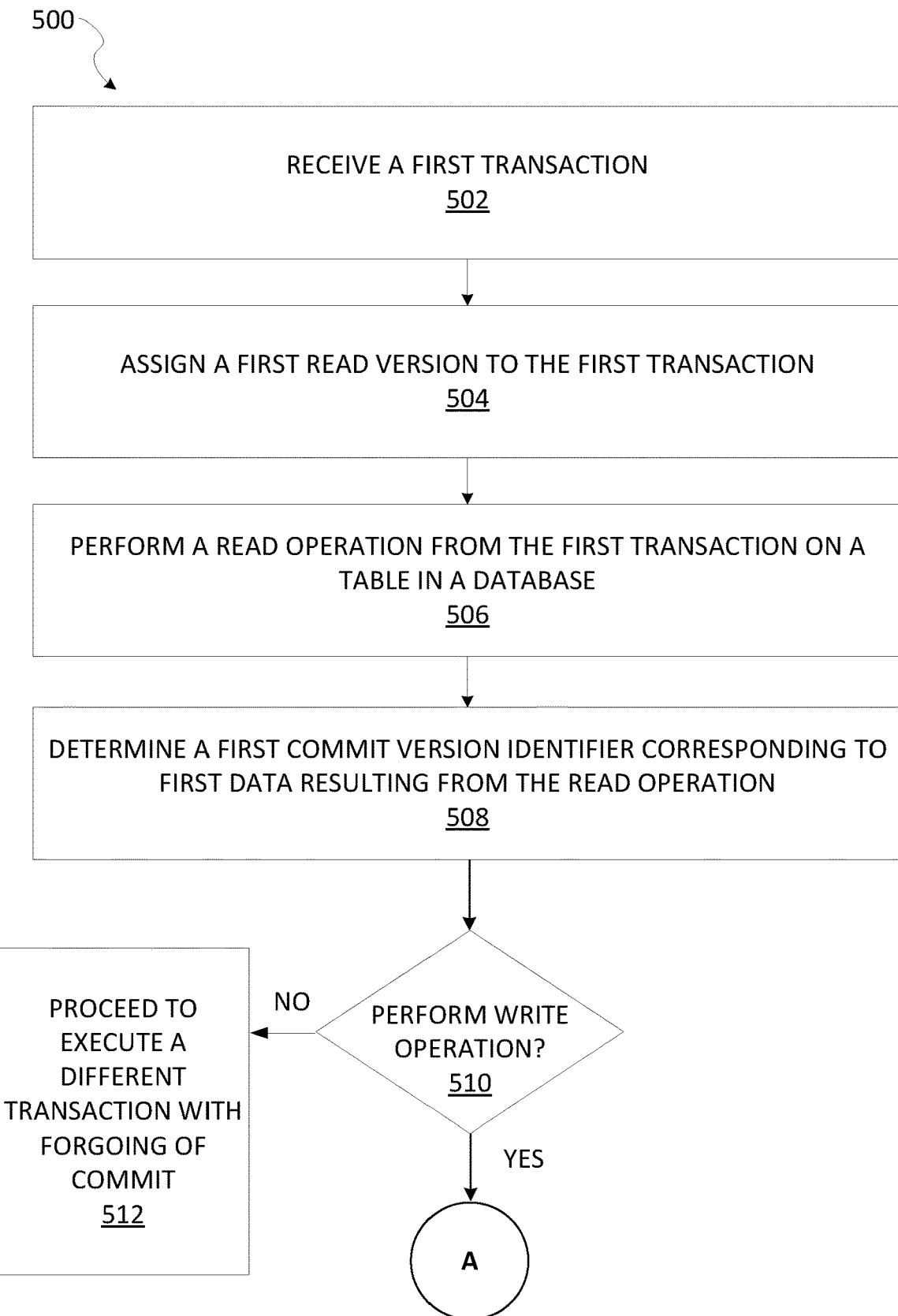
FIG. 5 is a flow diagram of method for implementing database transactions, in accordance with some embodiments of the present disclosure.

FIG. 5 is a flow diagram illustrating operations of a database system in performing a method, in accordance with some embodiments of the present disclosure. The method 500 may be embodied in computer-readable instructions for execution by one or more hardware components (e.g., one or more processors) such that the operations of the method 500 may be performed by components of network-based database system 102, such as components of the compute service manager 108 or a node in the execution platform 110. Accordingly, the method 500 is described below, by way of example with reference thereto. However, it shall be appreciated that the method 500 may be deployed on various other hardware configurations and is not intended to be limited to deployment within the network-based database system 102.

At operation 502, the transaction manager 440 receives a first transaction that is to be executed on linearizable storage.

At operation 504, the transaction manager 440 assigns a first read version to the first transaction. The first read version indicates a first version of the linearizable storage. Alternatively, a read timestamp can be retrieved from a clock service (e.g., the clock service 130), and a transaction identifier can be assigned to the first transaction where the transaction identifier corresponds to a read start time.

At operation 506, the transaction manager 440 performs a read operation from the first transaction on a table in a database.

At operation 508, the transaction manager 440 determines a first commit version identifier corresponding to first data resulting from the read operation.

At operation 510, the transaction manager 440 determines whether a particular write operation is included in the first transaction. If the particular write operation is to be performed with the first transaction, then the transaction manager 440 proceeds to perform a method as described below in FIG. 7.

Alternatively, when the transaction manager 440 determines that a particular write operation is absent from the first transaction, at operation 512, the transaction manager 440 proceeds to execute a different transaction (along with forgoing performance of a commit process for the first transaction), which is described, in an example, in FIG. 6 below. It is appreciated that due to the concurrency of transactions that are performed, the operations described further below in FIG. 6 can be executed at any time during the operations described in FIG. 5 above.

Figure 6:
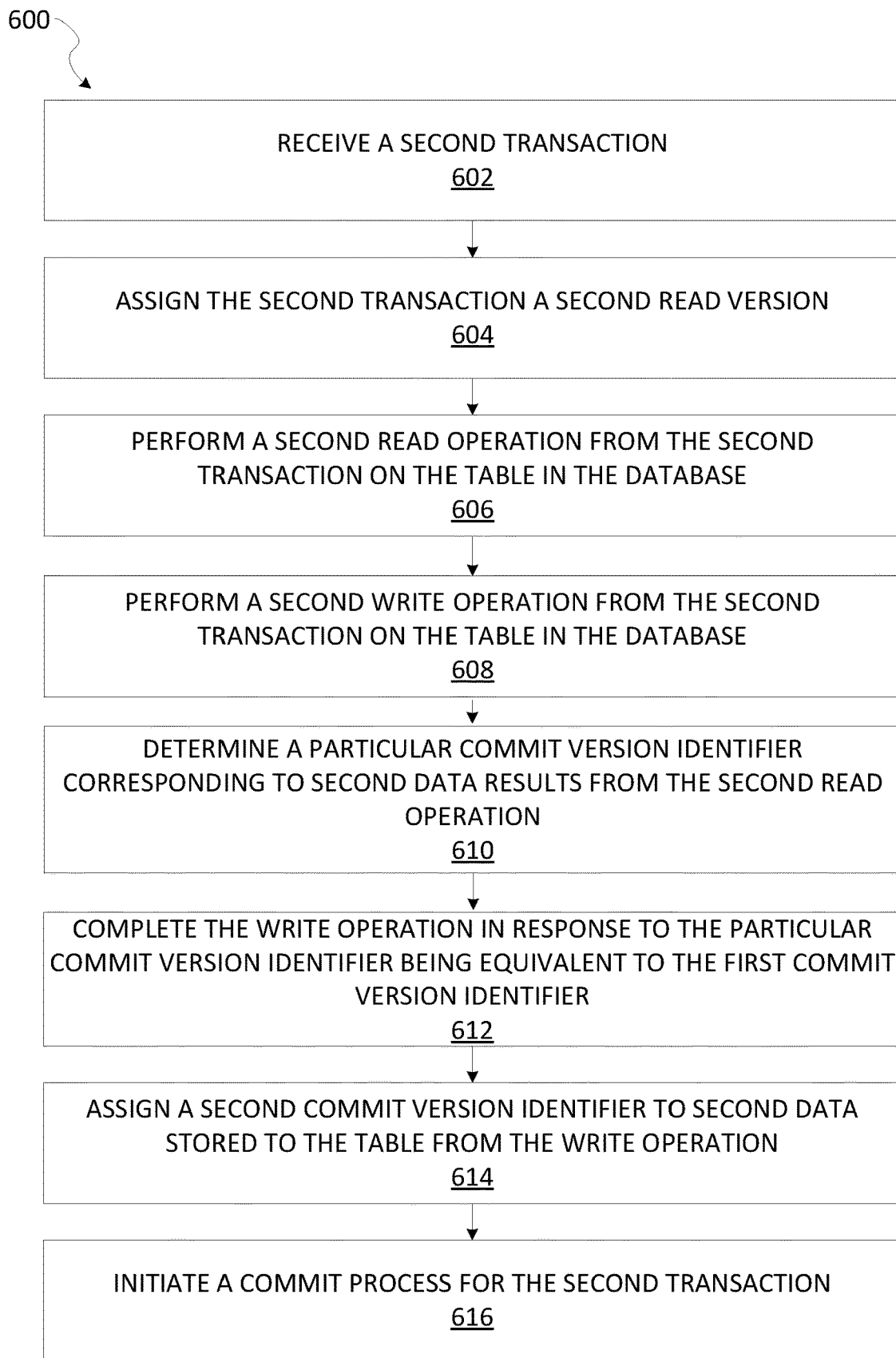
FIG. 6 is a flow diagram illustrating operations of a database system in performing a method, in accordance with some embodiments of the present disclosure.

FIG. 6 is flow diagram illustrating operations of a database system in performing a method, in accordance with some embodiments of the present disclosure. The method 600 may be embodied in computer-readable instructions for execution by one or more hardware components (e.g., one or more processors) such that the operations of the method 600 may be performed by components of network-based database system 102, such as components of the compute service manager 108 or a node in the execution platform 110. Accordingly, the method 600 is described below, by way of example with reference thereto. However, it shall be appreciated that the method 600 may be deployed on various other hardware configurations and is not intended to be limited to deployment within the network-based database system 102.

In some embodiments, the method 600 can be performed in conjunction with the method 500 as discussed above. For example, the method 600 can be performed after the operations of the method 500 or performed substantially concurrently with the method 500.

At operation 602, the transaction manager 440 receives a second transaction to be executed on linearizable storage.

At operation 604, the transaction manager 440 assigns the second transaction a second read version that indicates a second version of the linearizable storage.

At operation 606, the transaction manager 440 performs a second read operation from the second transaction on the table in the database.

At operation 608, the transaction manager 440 performs a second write operation from the second transaction on the table in the database.

At operation 610, the transaction manager 440 determines a particular commit version identifier corresponding to second data results from the second read operation.

At operation 612, the transaction manager 440 completes the write operation in response to the particular commit version identifier being equivalent to the first commit version identifier.

At operation 614, the transaction manager 440 assigns a second commit version identifier to second data stored to the table from the write operation, the second commit version identifier corresponding to a second version of data in the table. The second commit version identifier is different than the first commit version identifier.

At operation 616, the transaction manager 440 initiates a commit process for the second transaction.

Figure 7:
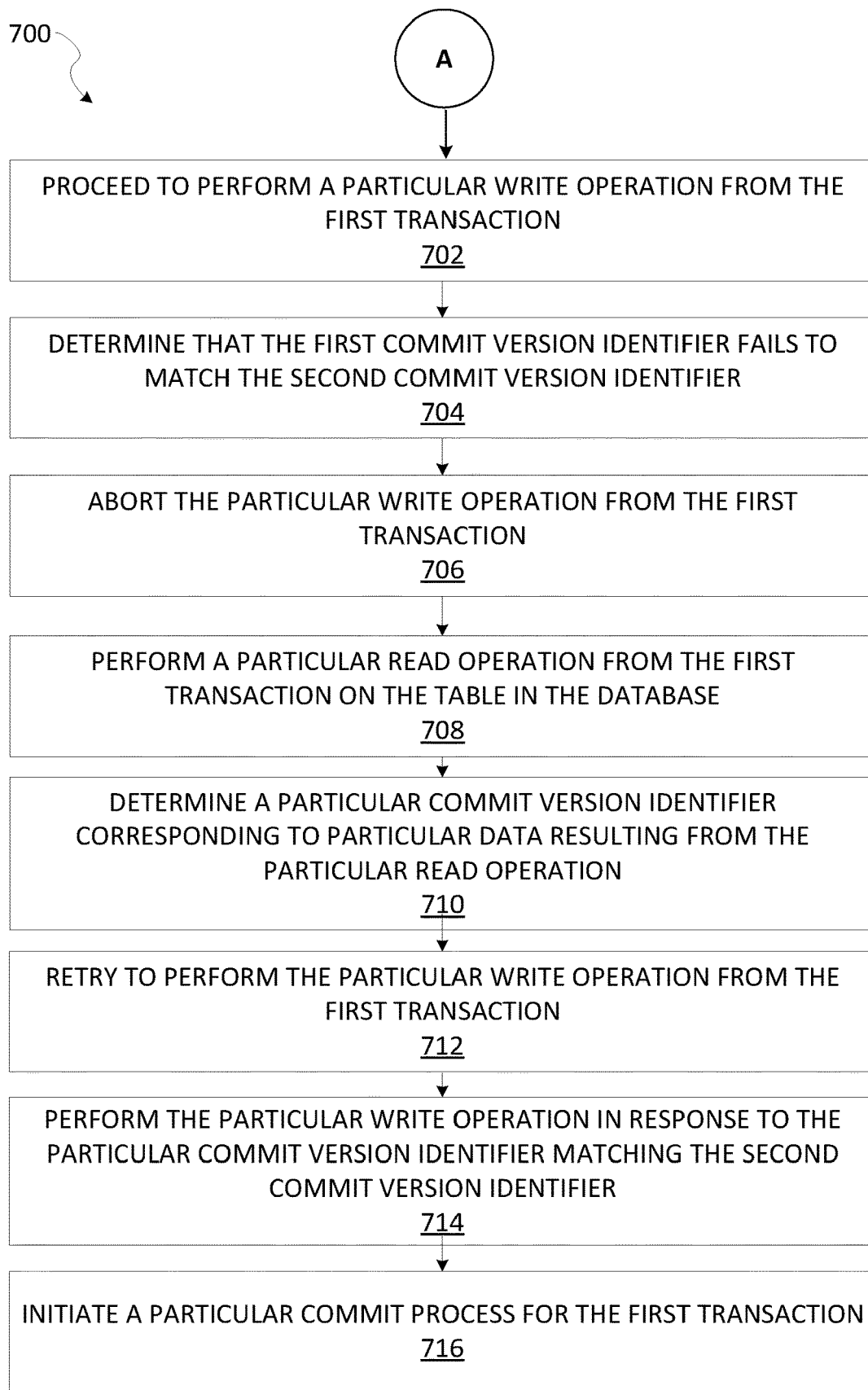
FIG. 7 is a flow diagram illustrating operations of a database system in performing a method, in accordance with some embodiments of the present disclosure.

FIG. 7 is a flow diagram illustrating operations of a database system in performing a method, in accordance with some embodiments of the present disclosure. The method 700 may be embodied in computer-readable instructions for execution by one or more hardware components (e.g., one or more processors) such that the operations of the method 700 may be performed by components of network-based database system 102, such as components of the compute service manager 108 or a node in the execution platform 110. Accordingly, the method 700 is described below, by way of example with reference thereto. However, it shall be appreciated that the method 700 may be deployed on various other hardware configurations and is not intended to be limited to deployment within the network-based database system 102.

In some embodiments, the method 700 can be performed in conjunction with the method 500 and the method 600 as discussed above. For example, the method 700 can be performed after the operations of the method 500 or the method 600 (or performed substantially concurrently therewith either method). At operation 702, the transaction manager 440 proceeds to perform a particular write operation from the first transaction. At operation 704, the transaction manager 440 determines that the first commit version identifier fails to match the second commit version identifier. At operation 706, the transaction manager 440 aborts the particular write operation from the first transaction. At operation 708, the transaction manager 440 performs a particular read operation from the first transaction on the table in the database. At operation 710, the transaction manager 440 determines a particular commit version identifier corresponding to particular data resulting from the particular read operation. At operation 712, the transaction manager 440 retry to perform the particular write operation from the first transaction. At operation 714, the transaction manager 440 perform the particular write operation in response to the particular commit version identifier matching the second commit version identifier. At operation 716, the transaction manager 440 initiates a particular commit process for the first transaction.

As discussed, the transaction manager 440 writes the key-value pairs in versions, and different versions can eventually become redundant. In some example embodiments, the older versions of the pairs cannot be removed immediately after the new ones are written, because there may be transactions still running in the transaction manager 440 that need to see the version through multiple version concurrency control.

In some example embodiments, the transaction manager 440 can generate a KV pair in the following format when a new record is created or otherwise inserted:

[Acct Prefix|Table ID|User Key|(Txn ID, SN, RC)|WriteTs]

In the above example format, only a transaction ID (Txn ID) is stated as at the key generation time; the commit time is not yet known since it is generated at a later time when the transaction (e.g., transaction data) commits to the database. In some example embodiments, to determine the status using the format above, the Txn ID is used to read from the Transaction Status Table (TST) to find the corresponding commit timestamp. As discussed above, the TST can be implemented to keep track of committed and aborted transactions. The TST is a persistent hash map saved in a Foundation Database (FDB) that maps a given Transaction ID to its metadata, e.g., including a list of finalized statement numbers and restart count, and the commit outcome including the transaction's commit timestamp, in accordance with some example embodiments. If a transaction is aborted, the value will be set to a minimum commit timestamp value. In some example embodiments, the compactor system rewrites the key by replacing the transaction ID with the Commit Timestamp, which records when the transaction has been committed.

[Acct Prefix|Table ID|User Key|Commit Timestamp-|WriteTs]

The compaction manager 470 can compact different types of KV pairs, in different cases, including:
- A. Old versions not needed for MVCC (e.g., KV pair (generated in old transactions) overwritten later by another transaction, and no longer needed for MVCC read).
- B. Versions in uncommitted transactions (e.g., KV pair in aborted transactions, KV pair in crashed transactions).
- C. Versions not visible in committed transactions (e.g., KV pair rewritten by the same statement, KV pair written by a statement later restarted, KV pair overwritten in the same transaction by a different statement, KV pair used for locking in committed transactions).
- D. Entries in Transaction Status Table (e.g., if the TST entry is not referenced by any key (due to no key contains its Transaction ID), if the transaction status represented by the TST entry has been acknowledged by GS).
- E. Versions not needed in both pending or committed transactions (e.g., KV pair written by an aborted statement). When the KV pair is written, the key contains the Transaction ID. In some example embodiments, when the transaction manager 440 checks the readability of a pair, it consults the TST to get its Commit Timestamp. The compaction manager 470 can rewrite the key to the format with Commit Timestamp embedded (e.g., as in case E above, versions not needed).
- F. KV pairs written in committed transactions but with (Txn ID, SN, RC) format.

Figure 8:
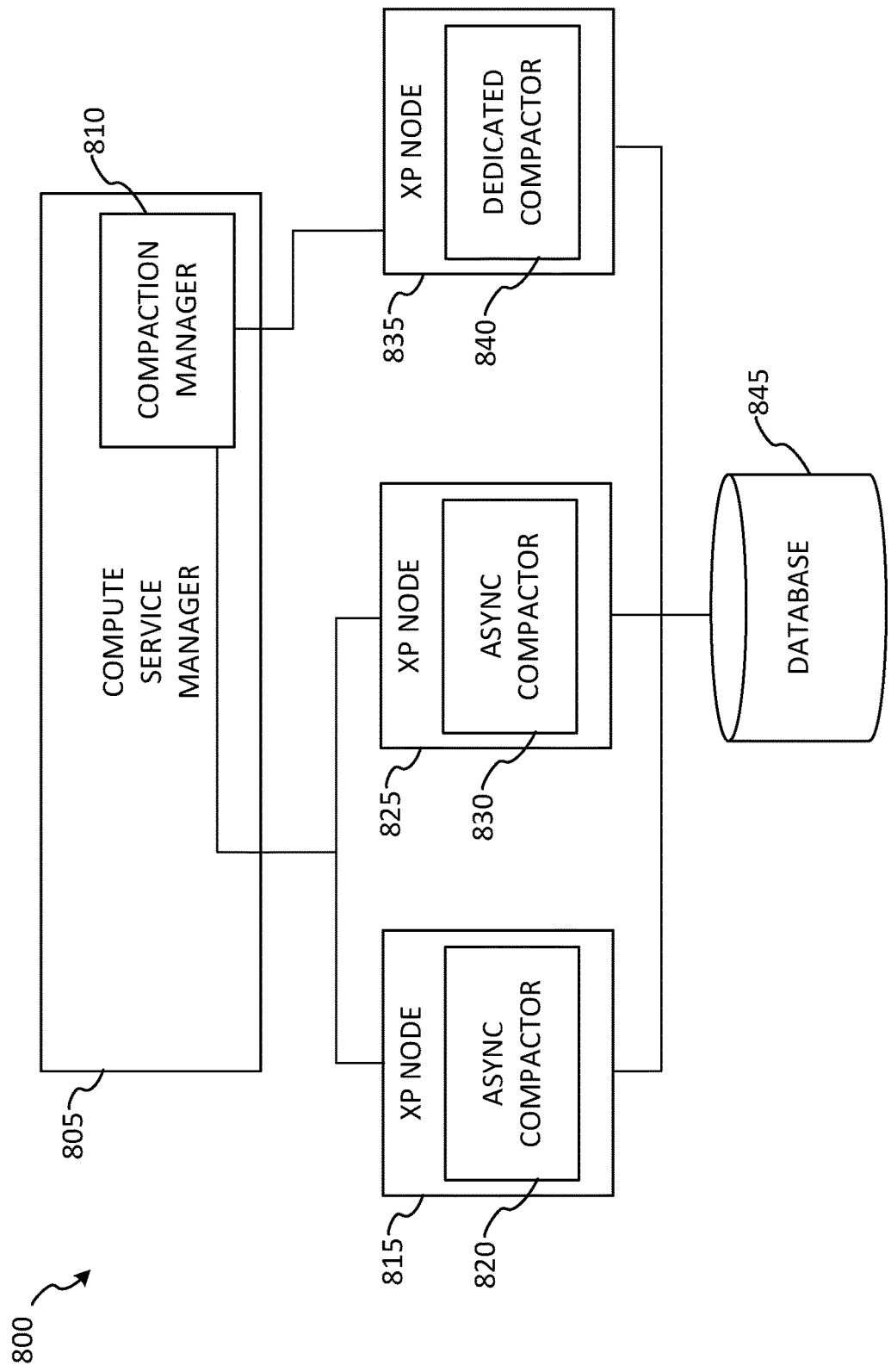
FIG. 8 shows a compaction system, in accordance with some embodiments of the present disclosure.

FIG. 8 shows a compaction architecture 800, according to some example embodiments. As illustrated, the compute service manager 805 (e.g., compute service manager 108) implements a compaction manager 810 (e.g., compaction manager 470) to schedule a dedicated background compaction task to be executed by the compute service in one or more execution nodes, such as a dedicated compactor 840 in the execution node 835. In some example embodiments, the schedule dedicated compaction task triggers an internal SQL statement which is pushed down to the execution node 835, with a storage definition language (SDL) via a query operator thread, KVCompact RSO. The KVCompact RSO scans the data in a database 845 (e.g., an FDB database contacted via an FDB API) and purges or transforms (e.g., rewrites) the old versions of the keys in different approaches. The following are example different approaches, in accordance with some example embodiments:
- For versions of committed transactions (case C, above), the keys can be directly deleted if the corresponding transaction is already committed.
- Versions of uncommitted transactions (case B) are more straightforward—the versions are no longer needed so as long as the compactor service knows whether the transaction is aborted or failed.
- The key rewriting (case E, above) is performed if the pair is transaction committed.
- For case A (old versions not needed by MVCC), the compaction manager 470 implements a compaction boundary (discussed below), as a low-water mark. In some example embodiments, older versions are only purged when they are older than the compaction boundary.

The Compaction Boundary: In some example embodiments, each statement handled by the transaction manager 440 reads the data of the statement based on its Read Timestamp (RTS), and the compaction manager 470 only purges the old versions if their corresponding commit timestamps are smaller than the minimum value of all live statement's Read Timestamps (RTS) within an account (e.g., provider database account, instance), which is referred to here as the Minimum Read Timestamp (MRTS). The versions that are equal to or larger than MRTS can still be used for the MVCC read. Thus, in accordance with some example embodiments, the MRTS functions as the compaction boundary when compacting.

In some example embodiments, the compaction manager 470 forces a limit on the maximum transaction lifetime (where, for example, supposing the transaction timeout value is TT), such that the compaction manager 470 is configured to safely assume that all the statements that are active started after Current Timestamp (CTS)-TT; and thus the following always true: CTS–TT<=MRTS, in these example embodiments.

In some example embodiments, the compaction manager 470 implements CTS-TT as the initial compaction boundary. Although old versions may not be garbage collected in a timely manner, the above initial compaction boundary is efficient to implement. Further, the compaction manager 470 implements the compaction boundary a parameter for the compact calls so that the compaction manager 470 can readily change the compaction boundary to MRTS from CTS-TT later. For example, if the transaction manager 440 maintains an accurate and up-to-date MRTS, the compaction manager 470 may do the compaction more aggressively, thereby more quickly purging the old versions once they are no longer used. In order to achieve this, the compaction manager 470 includes an orchestrator network service that calculates the MRTS based on each of the transaction manager's instance's live transactions. For example, this is done by having a dedicated process tracking the progress of all the XP processes. In some example embodiments in which Current Timestamp-Transaction Timeout is implemented as the compaction boundary, the value of TT is set to 1 hour, and the CTS-TT is used as the compaction boundary as well as the transaction abortion limit. Thus, in these example embodiments, no transactions can exist more than TT and the status of any transaction before CTS-TT has been successfully acknowledged by the clients.

Online Asynchronous Compaction: As illustrated, and in accordance with some example embodiments, the compaction manager 810 can implement online asynchronous compactors, such as async compactor 820 in execution node 815 and async compactor 830 in the execution node 825, which execute on the respective different nodes in parallel to perform compaction (in asynch compactor threads in each node) without affecting the query threads that complete the query.

For example, when the transaction manager 440 executes user queries, the compaction manager 810 can also do compaction via the async compactors (e.g., async compactor 820, async compactor 830). For example, during a range read by the transaction manager 440, a batch of KV pairs are fetched. After serving the online request to transaction processing threads (e.g., worker query thread), these pairs are then selected for compaction as batched. Although only two async compactors are shown in FIG. 8, it is appreciated that the number of async compactors can scale efficiently as increased numbers of queries are received. In some example embodiments, whenever the KV pairs are processed by online serving worker thread(s), the KV pairs are also offloaded to the compaction threads of the compactors (e.g., async compactor 820, async compactor 830), for asynchronous garbage collection and transformation (e.g., to commitTs embedded format). In this way, the online async compactors can effectively and efficiently purge and/or rewrite the keys in batches, without impairing online OLTP performance (e.g., the user's query can complete early, before the on-the-fly compaction, without being affected by the compaction).

In some example embodiments, when a transaction commits or aborts, some versions can be purged immediately (e.g., those associated with transactions that have known outcomes: cases B and C). Further, as the transaction manager 440 implements a distributed execution model, statements within a transaction could be executed on different XP processes. Further, since tracking all the writes for a specific transaction at a single place can be expensive, in some example embodiment compaction is not performed after a transaction terminates.

In some example embodiments, the following instructions implement the compaction steps to purge keys and/or rewrite keys. In some example embodiments, the following instructions are implemented as an application programming interface (API) of the transaction manager 440. The callers of the instructions below (e.g., online asynchronous compactors, dedicated and scheduled compactor) pass the input to the instructions in a valid format to run (e.g., compaction boundary is correct, pairs belong to same table, etc.).

ments, the TST is compacted by purging keys with Transaction IDs that have already been rewritten and have existing rewritten versions (e.g., with commitTs replacing the Txn IDs). In some example embodiments, the dedicated compactor 840 implements the following instructions to perform the compaction:

```
::::::::CODE BEGIN::::::::
void compactTxnStatusTable_(Timestamp boundary)
{
    1. Scan the TST Table for TxnStatusKey and TxnStatusValue pairs
    2. Put the Txn Status Key into the deletion list,
       if Commit Timestamp is less than boundary
    3. Traverse the deletion list and call deleteTuple for each key
}
::::::::CODE END::::::::
```

In some example embodiments, the TST is cached using TST cache support. The compactTxnStatusTable_ call will delete the entries in TST but the entries in TST cache are not deleted from the cache, because it should be guaranteed that no KV pairs with a Commit Timestamp less than the boundary need to consult the TST. Thus the deleted Txn Status Key will never be read in the TST cache, and will eventually be removed by the TST cache eviction or rebuild.

Online Asynchronous compaction caller(s): In some example embodiments, during read and readRange calls by the transaction manager 440, the compaction manager 470 calls compact_ using the read its own Read Timestamp—TT

```
::::::::CODE BEGIN::::::::
void compact_ (const KVPairs & pairs, const Timestamp boundary, boolean
purgeObsolete)
{
    1. Traverse the KVPairs and for each KV pair:
        a. Read the Transaction ID from the TxnKey and consult the TST or
           TST cache.
        b. If the transaction is live (not committed or aborted), skip this pair.
        c. Put the Key into the deletion list, if
            i. If the transaction is aborted or crashed,
            ii. If the transaction is committed, and its IsLock flag is set,
            iii. If purgeObsolete is true, the transaction is committed, the
                 IsTombstone flag is set and its commit timestamp is less than
                 the compaction boundary (see "tombstone" discussed
                 above).
            iv. If the statement restart count is not the maximum RC for the
                 statement
        d. If the transaction is committed, and the key is not the only version
           for the user key, check the next version for the same user key, put
           the Key into the deletion list,
            i. If the next version in the same statement / transaction, and
               it is an old version
            ii. If purgeObsolete is true and the next version is in a
                different transaction, and its commit timestamp is less than
                the compaction boundary.
        e. If the key is not put into the deletion list and the key is in the format
           with (Transaction ID, SN, RC) tuple, read the transaction's Commit
           Timestamp "commitT" and generate the new key format, that
           includes the commitT. Further, put the old key and the new Key with
           the Value as KV pairs into an update map for efficient processing
           without requiring access to the TST for the commitT.
        f. If the key is not put into the deletion list and it is in the format of
           Commit Timestamp, skip this pair
    2. For each key in the deletion list, delete the corresponding FDB key
       by calling KeyValueStore::deleteTuple
    3. For each entry in the update map, insert the new KV pairs first and then
       delete the old key.
}
::::::::CODE END::::::::
```

In some example embodiments, the Transaction Status Table is purged to compact the table to reduce the overhead when reading from the table. In some example embodias the compaction boundary, where the KV pairs are saved in the KVCursor buffer as the pairs input for asynchronous compaction. In some example embodiments, the asynchronous compactors run as internal tasks of which the customer is not aware is occurring (e.g., end user submitting a given query does not initiate the async compactors, which run in the background upon the query being submitted). The asynchronous compactors perform transformation and compaction of keys, but do not clean the entries in TST and do not call compactTxnStatusTable. In some example embodiments, to ensure that compaction works correctly, even if the range query results span multiple batches in the KVCursor, the last pair from the previous batch is added with the current batch as the pairs to be compacted via the compact call.

Dedicated compaction caller: In some example embodiments, a dedicated compactor 840 runs as a thread in one or more of the execution nodes, such as execution node 835. The dedicated compactor 840 can purge all the cases and also rewrite the key format (to include commit timestamp). In some example embodiments, the compaction workflow for a table is implemented by the dedicated compactor 840 as follows:

1. The dedicated compactor 840 requests and receives the list of tables from the compute service manager 805.
2. The dedicated compactor 840 reads data from the database 845 (e.g., FDB API of an FDB database) for current timestamp (CTS) values and calculates the compaction boundary as (CTS-TT).
3. For each table, the KeyValueStore's read range API is called to fetch a batch of KV pairs.
4. Call compact_ for each KV pairs batch (see "void compact [ . . . ]" above).
5. If the call compact_ succeeds, call compactTxnStatusTable_ using CTS-TT as the boundary, thereby compacting the TST (e.g., by purging).

Figure 9:
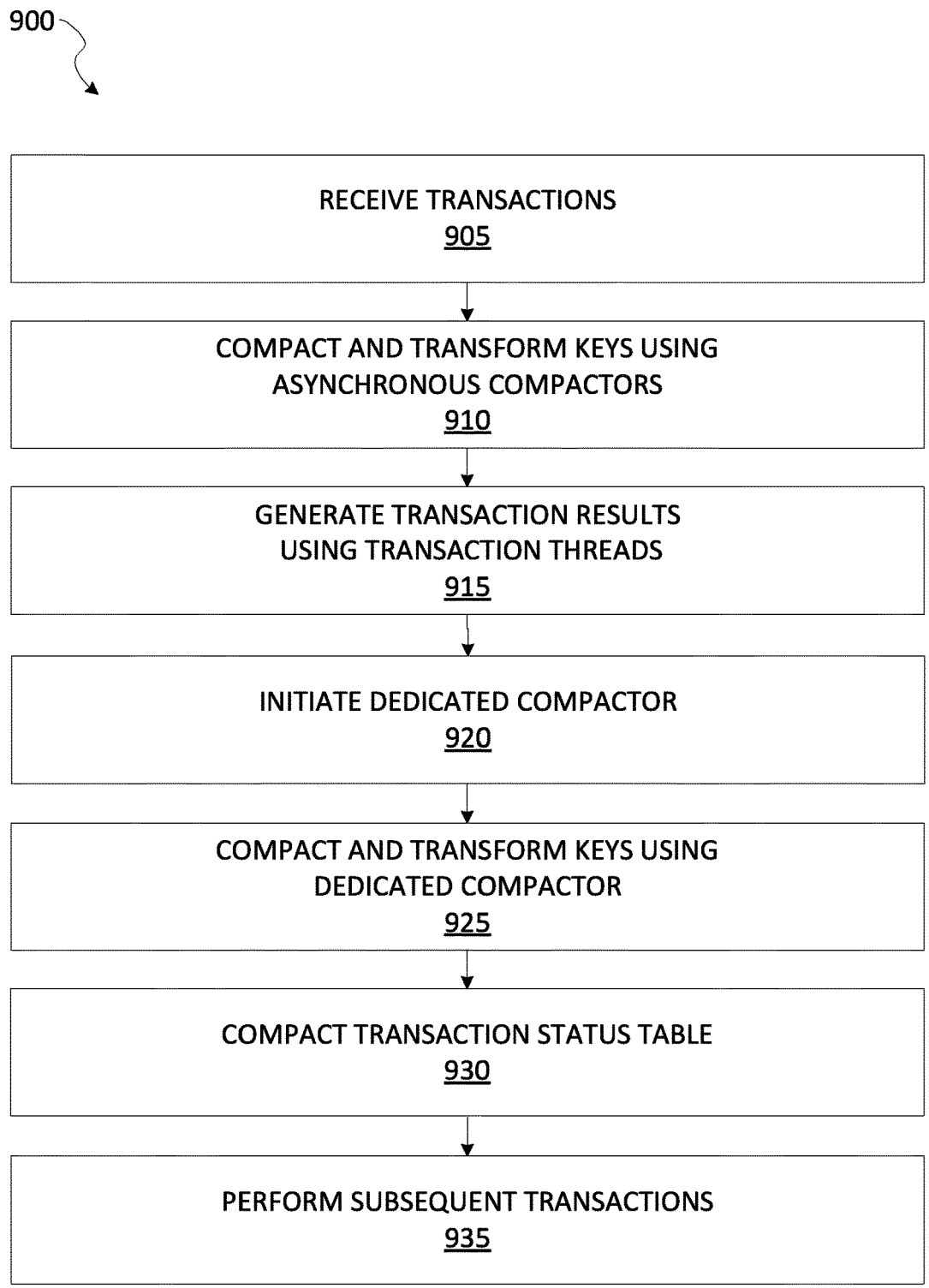
FIG. 9 shows a flow diagram for compacting database data, in accordance with some embodiments of the present disclosure.

FIG. 9 shows a flow diagram of a method 900 for performing compaction in a database, according to some example embodiments.

At operation 905, a database system receives transactions. For example, the transactions are received from jobs 410 and processed using the transaction manager 440 using one or more execution nodes (e.g., XP nodes).

At operation 910, one or more asynchronous compactors in execution nodes transform the keys in batches and purges the old keys. For example, by replacing the transaction ID with a commit timestamp for each key in a batch, and deletes the old keys in the transaction ID format, across all asynchronous compactor execution nodes in parallel.

At operation 915, the transaction results (e.g., reads or writes) are completed using separate transaction threads that are not affected by asynchronous compaction threads. For example, a user's query thread of a node may complete (e.g., read and return data, write data) before or after the asynchronous compaction thread of the node is complete.

At operation 920, the dedicated compactor 840 is initiated. For example, the dedicated compactor 840 is periodically initiated, e.g., once an hour, to compact every KV table in the database.

At operation 925, the dedicated compactor 840 transforms and purges the keys. For example, the dedicated compactor 840 rewrites the keys to commit timestamp embedded format and deletes the original keys with the transaction IDs.

At operation 930, the dedicated compactor 840 compacts the transaction status table. For example, the dedicated compactor 840 calls a transaction status table compaction function that purges, from the TST, keys that have been rewritten (e.g., rewritten by the async compactor 820 and async compactor 830, rewritten by the dedicated compactor 840). For example, as the commit timestamp is in the key, the TST no longer needs to store the corresponding transaction ID for the transaction. As such, the batches of transactions in the TST can be purged and the TST can thereby be significantly compacted.

At operation 935, subsequent transactions of new queries are received and performed by transaction manager 440. For example, the new queries can be more efficiently performed by reading the commit status directly from the query (e.g., embedded commit timestamp in the transformed key). In some example embodiments, each query plan of the new queries is configured to use the commit timestamp in the key, instead of requesting data from the status table. For instance, the query is still constructed by the querying user in the same way (e.g., same query statements as when the key is in the Txn ID format and the TST must be checked), but the execution handling of the query is modified to read all the key value pairs for a user case, determine whether any of the keys contains a commit timestamp, and use the commit timestamp for the query, instead of checking the TST. In some example embodiments, if a key contains two commitTs, the transaction manager 440 selects one for the current commit timestamp (e.g., more recent commitT). In some example embodiments, the execution handling of the compaction manager 470 implements Read Committed isolation level, in which each query can only access data committed before the query began (not the transaction began). For example, where:

1. T1 insert a key value pair <k1, v1> and committed at s1;
2. T2 update this pair to <k1, v2> and committed at s2;
3. T3 update this pair to <k1, v3> and committed at s4; and also where,
4. Another transaction T4 started at s3, and try to read k1's value, then, in some example embodiments, the execution handling checks the transaction's commitT values and returns v2 for the T4 transaction.

KV Secondary Indices:

As mentioned herein, "KV" refers key-value or key value and can be used interchangeably with "hybrid", "PK" refers to primary key, "FK" refers to foreign key, "DDL" refers to data definition language, and "SI" refers to secondary index of a hybrid table.

In some example embodiments, hybrid system 230 is configured to perform transactional and analytical workloads (e.g., OLTP and OLAP queries) using hybrid tables. Hybrid tables are relational tables stored in FDB-backed data stores. They offer high performance when it comes to DMLs and primary-key lookups. However, hybrid tables' scan performance drops significantly when a predicate exists only for non-primary key columns. In addition, hybrid tables cannot enforce uniqueness and referential integrity constraints on non-primary-key columns efficiently. Secondary Indexes for hybrid tables are aimed to improve the performance of the aforementioned operations.

Providing index functionality for hybrid (HTAP) tables: The indexes will be used for efficient lookups, updates, and constraint enforcement. Hybrid tables are a novel type of table that can offer good performance for both transactional (OLTP) and Analytical (OLAP) workloads. In the past, customers would require two separate systems for each type of workload and customers of the database system 102 wouldn't have access to indexes.

The hybrid system 230 provides the benefit of running OLTP/OLAP workloads in a single-engine. At the same time, the hybrid system 230 indexes are designed to work with OLAP system of the system 102 and does not require additional data movement. The hybrid system 230 is configured to perform both transactional and analytical workloads in a single hybrid database system, and provides efficient non-primary key lookups and constraint enforcement with transactional guarantees, without compromising analytical performance, in a fully-managed environment.

Hybrid Tables: In some example embodiments, every hybrid (key-value) table is required to have a primary key (PK), which is defined as a subset of its columns. A PK is used to formulate the key used to store each KV record in the FDB-backed Data Store. In turn, all KV records are stored in an ordering dictated by the PK. A KV table's Secondary Index (SI) is an access structure stored in the FDB-backed data store, which aids in performing lookups on non-PK columns efficiently. Since SIs will be used in the same FDB-backed data store, their records are defined as key-value pairs. An SI record's key is different from the PK for the same KV table. For example, assume the following KV table defined as:

```
CREATE HYBRID TABLE kvtab (
id int primary key, order_date date,
user_id int, price float, category string);
```

The KV table kvtab uses ID as a PK and its records will be stored in an FDB-backed data store. To this end, each record should carry a unique key and a value. In our example, all kvtab records will be stored in the FDB-backed store in the following form:
kvtab record: (100111, 2021-04-30, 5032, 38.22, 'Misc.'), then the FDB-backed representation will be something like:

| Key | Value |
|---|---|
| 0x1234567891100111 (kv-table-prefix id-value) | 20210430\|5032\|38.22\|Misc (order_date \| user_id \| price \| category) |

An SI will be a complementary KV table, whose existence is tied to the original KV table. The SI enables fast retrieval of the PK(s) of records satisfying a user-defined property defined on non-key column values. For instance, if an SI is defined on the user_id column, then a valid index mapping would be a function that maps each user_id value to an id value:
kvtab record: (100111, 2021-04-30, 5032, 38.22, 'Misc.'), then the FDB-backed representation of each record for the SI on user_id will be:

| Key | Value |
|---|---|
| 0x1234567af1b5032 (si-kv-table-prefix user-id-value) | 100111 (id) |

KV Tables: Every Key-Value (KV) table has a primary key (PK), which is defined as a subset of its columns. A PK is essential to formulate the key used to store each KV record in the FDB-backed Data Store. In turn, all KV records are stored in the ordering dictated by the PK. A KV table's Secondary Index (SI) is an access structure stored in the FDB-backed data store, which aids in performing lookups on non-PK columns, and constraint enforcement efficiently. Since SIs will be used in the same FDB-backed data store, their records are formulated as key-value pairs. The data layout for KV tables includes a prefix, followed by the actual data, which includes a key and a value. The key for each KV record is a concatenation of the prefix and the key for a particular record.

In an implementation, an SI of a KV table can be summarized as:
  A permanent KV table, whose records are stored in the FDB-backed data store (e.g., provided by storage platform 104).
  Dependent on the base KV table.
  "Invisible" as it cannot be queried by itself (e.g., perform a SELECT query on it); rather, it can be scanned as part of a more elaborate query.
An SI's information should be efficiently stored in the metadata. On top of this, an SI should inherit the same access rights as the base table (including RBAC (role-based access control) policies).

In this following discussion, an SI's fields are discussed and a hybrid Java/SQL notation is utilized for describing data types.

In an implementation, the following "metadata" information is stored for a SI:
1. Unique Id for the SI.
2. Name: The name of the SI
3. Base Table: The base table the SI is defined on.
4. Unique: a flag indicating whether the SI is unique or not.
5. (Collection<IndexColumn>) IndexColumns: This is a collection of the SI's columns formulating its key. Each IndexColumn object can be represented by the same TableColumn object of the base-table, or just the id of the TableColumn object (i.e., the corresponding BaseDictionaryDPO unique id).

Data Layout

As mentioned above, the data layout for KV tables includes a prefix, followed by the actual data, which includes a key and a value. The key for each KV record is a concatenation of the prefix and the key for a particular record. In an implementation, the data layout includes the following:
  A. SI-Prefix: the prefix used for all records of a SI.
  B. SI-Key-Layout: the suffix appended to the key of each SI record.
The following discussion relates to the SI-Prefix mentioned above.

Each SI is represented as a nested table in metadata. As a result, each SI carries (i) a global unique identifier (BaseDictionaryEntity.id), (ii) a parent table (Table.NestingContainerId), and (iii) a list of columns that include the key of each SI record.

As discussed below, in order to accommodate a SI, two implementations of a data layout are provided for the SI-Prefix. Both of them require a local index id, which will be used to uniquely identify each SI in the context of its parent table.

The following discussion relates to an Index-ID that represents a sequential identifier for each SI.

Each SI is identified by a sequence number, named Index-ID, which is unique in the context of a KV table. For the Index-ID, the following can be utilized 1) the local table ID extracted from the SI's Table.id, (4 bytes); or, 2) a shortened Index-ID for each SI can be introduced. This shortened Index-ID can be tracked by an increasing counter for each KV table. This involves additional metadata on the TableDPO which will be a single counter named indexCounter. This indexCounter will have a different utility on the base and each SI:

Base Table: Indicate the number of SIs that have been historically defined for this table. The PK index, which is the base table itself, is not included in this count.

SI: Indicates the ID of the SI

Every time a new SI is added, the indexCounter is incremented, and the new value is used as an identifier for the new SI.

Figure 10:
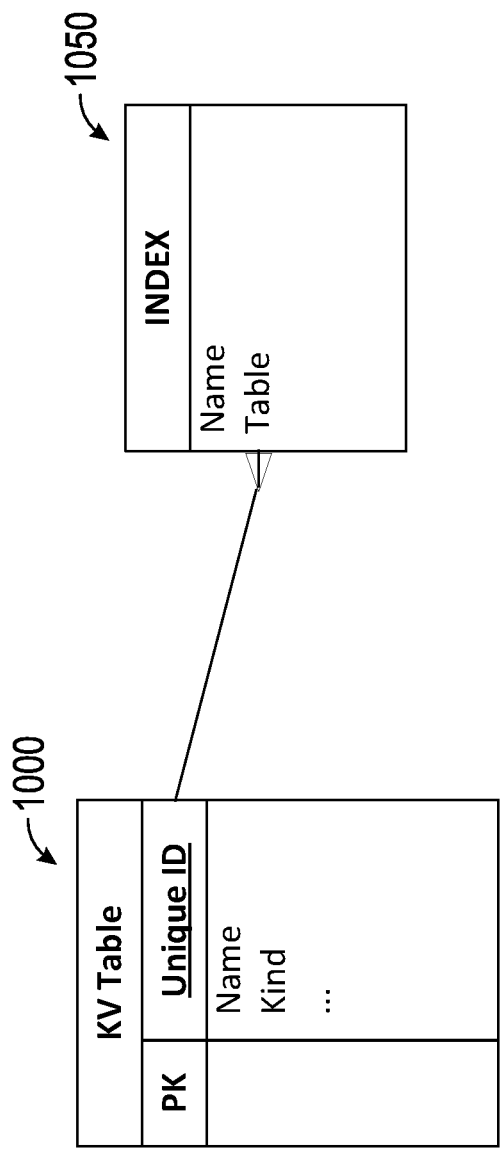
FIG. 10 illustrates a relationship between a secondary index and its key value (KV) base table in accordance with embodiments of the subject technology.

FIG. 10 illustrates an SI prefix metadata layout including a new index category in accordance with some embodiments of the subject technology.

As illustrated, metadata layout 1000 represents a database directory byte-encoded prefix.

This approach adds an additional data type under the Incarnation Number. In an implementation, Key-value Data Layout data types include the following:

Undo: type code 1
Data: type code 2
Schema: type code 3 where each type code above is a different (unique) type code

A new category, named Index, is added. Under this code, each SI will be stored using its table-local Index-ID code. Overall, this approach introduces an additional byte payload equal to the byte size of Index-ID.

In an embodiment, UNDO support is provided for SIs. To this end, the Undo path includes a flag to differentiate the UNDO data for the base table and for each SI. This leads to the following approaches.

New Index-Undo Under Incarnation Number

This entails that in the prefix under the incarnation number there will be an additional category, namely Index-Undo, under which all Index undo data are stored (including the IndexID).

Differentiate Undo Data Based on the Data Type

This entails that under Undo, the following flags are added:

UNDO_DATA: undo space for data
UNDO_INDEX: undo space for Secondary Indexes.

Each one of those flags can be a single byte to differentiate the different types of undo data.

SI-Key-Layout

This section discusses the storage format for the suffix used in the keys of SI records. The following notations are mentioned further below:

SIPrefix: This is the SI-Prefix used for each SI.

SIColX: This is a base table's column value that is used in position X for a

SI's key. For instance, if SI foo is defined over columns (a, b), Then SICol1 is a, SICol2 is b, and the key for foo's records is the concatenation of SICol1SICol2.

KVPrimaryKeyValue: This is the value(s) that includes the primary key for a base table's record.

The KVPrimaryKeyValue inherits the same conventions and limitations from the base KV table (i.e., it can not include non-scalar columns2). In addition, it will be serialized in the same way as it is serialized for identifying the base table's records. Below, two implementations for the layout of SI records are discussed (e.g., unified layout, and non-unified layout).

Unified Layout for SIs

By adopting a uniform layout design, the Unique and Non-Unique layouts can be combined to always include the KVPrimaryKeyValue in the key suffix, and maintain an empty value. The lookup logic for unique SIs can operate differently for different SI types (e.g., before updating a unique SI's record, lookup if a record without the KVPrimaryKeyValue suffix exists). In essence, the layout will be the following for all types of SIs:

| Key | Value |
| --- | --- |
| SIPrefix/SICol0SICol1.../KVPrimaryKeyValue | null |

In this case, the logic for retrieving records from unique and non-unique indexes differs:

Unique: the lookup is performed using just the SI columns. If a record is found when a DML is submitted, then a conflict should be thrown to indicate that a record with the same column value(s) already exists.

Non-Unique: the lookup will only search for the values of the SI columns (i.e., SICol0SICol1 . . . ). If records are found, no conflict is thrown as it is a non-unique SI.

With the unified layout, a validation phase is essential at the end of a DML Statement/Transaction. This validation can be implemented by offer either of the following APIs:

1. Serve concurrent non-committed updates/inserts on a specific range.
2. Register read ranges in a Transaction's/Statement's conflict map.

For example, if two transactions are trying to insert the same unique value (email) concurrently:

T1: INSERT INTO user VALUES (1, "abc@gmail.com", "Dimitris");
T2: INSERT INTO user VALUES (2, "abc@gmail.com", "Nikos");

Then, to protect from constraint violation, T1 (or T2) should do the following:

1. Insert a record in the base table: <1, abc@gmail.com|Dimitris>.
   a. stmtCtx.insert([userTablePrefix|1], [abc@gmail.com|Dimitris])
2. Insert a record in the unique index using the uniform layout:
   <abc@gmail.com|1, null>.
   a. stmtCtx.insert ([uniqueEmailIndexPrefix|abc@gmail.com|1, [ ])
3. Validate using either one of the following schemes:
   a. Read for any committed or uncommitted records in the unique index with key prefix "abc@gmail.com". If any record is found, then restart.
      i. stmtCtx.readRange ([uniqueEmailIndexPrefix|abc@gmail. com|0], [uniqueEmailIndexPrefix|abc@gmail.com|Inf])
   b. Record the range (abc@gmain.com|0, abc@gmail.com|Inf) in the conflict-map for the given transaction. This way, if another transaction tries to write in this range, transaction manager 440 will detect a conflict and only one transaction will be allowed to commit.
      i. stmtCtx.registerConflictRange (abc@gmain.com|0, abc@gmail.com|Inf, long timestamp)
4. Commit.

Non-Unified Layout for SIs

This implementation follows a different key layout depending on the type of an index.

For unique SIs, the key will be the combination of column values that constitute the key, and the value will be the primary key for the base table.

| Key | Value |
| --- | --- |
| SIPrefix/SICol0SICol1.../KVPrimaryKeyValue | null |

FIG. 10 illustrates a relationship between a secondary index and its key value (KV) base table in accordance with embodiments of the subject technology.

As shown, a relationship between an SI 1050 and its KV base table 1000 is N:1. In an implementation, at SI definition, the following checks need to be successful:
1. Existence of a base table.
2. The base table is a hybrid table.
3. Existence of the base table in the same schema, database, and KV backend datastore.
4. The referenced columns of the base table exist.
5. The referenced columns are of scalar data types.
6. No Existence of an SI with the same name for the base table.
7. No Existence of an SI on the Base Table with the same order of columns.

In an example, a set of actions that are performed include the following:
1. If a SI is unique, or a column of a KV table is defined as Unique, then a uniqueness constraint needs to be registered in the metadata.
2. If a PK-FK relationship is defined, a non-unique SI needs to be registered to the base table (i.e., referencing) along with a FK constraint.
3. At DML, the enforcement of unique constraints needs to be validated.
4. At DML, the enforcement of referential integrity constraints need to be checked.
5. For SELECT and DMLs, if SIs exist, then they should be used by the compiler.

SI Metadata Layout

In an example, SI-related metadata will be accessed at query compilation, planning, and optimization phases of a query. During those phases, the following lookups can occur:
I. Find all the SIs for a given KV table.
II. Find the information for a given SI id/name.
III. Find all the SIs for a given account.
IV. Find all the SIs for a given database/schema.

In an example, as discussed before, an SI should is defined as a permanent KV table itself, as its storage will be the FDB-backed datastore. To this end, the existing KV secondary slice for KV tables can also be used. As discussed below, various approaches to accommodate SI's metadata in the subject system are provided.

SI View Object with Nested-Objects Framework

In an example, a first approach to reflect the nested relationship of SIs with their base tables is to use the newly-introduced framework for Nested-Objects. This framework is introduced to address the common pattern of codifying dependencies among metadata entities. In essence, the base table is the "Containing Object", and each SI becomes a "Nested Object". SIs are "system-managed" and are only query-able by the system (i.e., a user cannot perform scans on them). Some benefits of using the nested-object framework include the following:
The SI automatically inherits the RBAC (role-based access control) of the base table.
SIs' metadata footprint is connected to the base table.
Allow the 1-to-N relationship among base tables and indices.
The SI is constrained to the same-account as the base table (along with the same database and schema).
Metadata management can be cleaner as it reduces the probability of dangling SI metadata.

In an example, in a second approach, akin to a Materialized View (MV), an SI can be represented in GS as a subclass of the Table object. However, the metadata backend is still stored as a TableDPO (e.g., table data persistence object). Functionality for KV table indices can be moved as part of a new class (e.g., named KvSecondaryIndex). If predicates and complicated expressions need to be supported for SIs, then the Table objects definition field can be used to accommodate columns, predicates, and the unique flag defined in secondary index fields. In an implementation, the unique flag can be stored as a constraint on the table.

In an example, to expedite retrieval of SI metadata and to avoid exceeding a time limit for an FDB transaction, an SI-specific secondary slice is needed. This new slice will be similar to the KV-table Secondary Slice used by the transaction manager 440 compactor. This SI-specific secondary slice will only include basic information for active SIs of a specific account. In detail, the secondary slice keys can be the following:
1. Base Table ID
2. Unique Flag
3. Index Name (or SI identifier)

In an example, this secondary slice can expedite the lookups needed for retrieving all indices for (i) a specific account, and (ii) a specific base table (i.e., lookups outlined in the Supported Statements section). In addition, this new secondary slice will expedite the operations enumerated in the beginning of this section. In an example, additional fields can be added in the key of the secondary slice.

In an implementation, features from the first approach and the second approach are combined. In detail, a SI will be stored as a TableDPO with its parent being the containing schema (same as a regular table) (i.e., TableDPO.parentId is the schema id). In addition, a SI will not be considered a KV table itself (i.e., TableDPO.isKeyValue( )==false), to avoid interfering with existing KV table operations. The SI will inherit all KV-backend information from its base table (e.g., datastore-ID, KV-database, etc.), which will be retrieved from the base table (as it is a common pattern to first retrieve the base table metadata prior to the SI metadata). Also, the SI will carry an TableDPO.IndexType, an TableDPO.indexSourceTableId, and its own column definitions. On top of this, the connection with the base table will take place with the nesting framework (this will allow us to not introduce a new secondary slice).

In addition to the above, each index will carry the following two fields:
1. kvIndexCounter: This field is used to generate unique index identifiers in the context of a KV table.
2. kvIndexStatus: An enum field that would indicate whether DMLs should be propagated to a SI and whether the SI should be used for querying the base table and constraint enforcement.

In an implementation, a table is the main entity in a database. Each table belongs to a schema, which in turn belongs to a database. When interacting with FDB for table operations, all interactions take place using the TableDPO representation. In an example, fields of a TableDPO include the following:
accountId: the account that the table belongs to.
Id: a unique identifier for the table.
parentId: the unique identifier of the parent entity. This is the schema unique identifier.
name: The name of the table.
kindId: The kind of a table. For Secondary Indices the value KEY_VALUE_INDEX can be used.
mvTypeId: The type of a materialized view in case the table is a materialized view.

mvSourceTableId: The id of the source table id if the table is a materialized view.

Metadata Changes for Indices

In an implementation, a secondary index is accommodated as a table in existing metadata. An index's structural information is accommodated in a TableDPO, and constraints in multiple ConstraintDPO objects.

Constraints are represented in metadata using the ConstraintDPO object. In an example, ConstraintDPO fields include the following:

deferrable: this enumeration defines the deferrability of a constraint
  InitiallyDeferred
  InitiallyImmediate
  NotDeferrable
definition: a literal representation of the constraints definition
id: the unique identifier of a constraint.
kindId: This can be any of the following values:
  NOT_NULL
  PRIMARY_KEY
  UNIQUE
  DEFAULT
  CHECK
  MISSING
  FOREIGN_KEY
name: the name of the constraint.
parentId: is the unique identifier of the base table (i.e., TableDPO.id).
tableColumnId: The base table's column in which the constraint is defined on.
updateAction: This is the action taken for the constraint on update. This can take any of the following values:
  CASCADE, SET_NULL, SET_DEFAULT, RESTRICT, NO_ACTION
deleteAction: This is the action taken for the constraint on delete In an implementation, a PK constraint is created for each KV table. If an SI is associated with a uniqueness constraint on a subset of columns, then a UNIQUE Constraint entry should be maintained in the Metadata. If an FK constraint is defined, then it should be reflected in the metadata as a FOREIGN_KEY constraint between the referenced and the referred tables. At the moment, KV tables store their PK constraints using the existing ConstraintDPO infrastructure.

Figure 11:
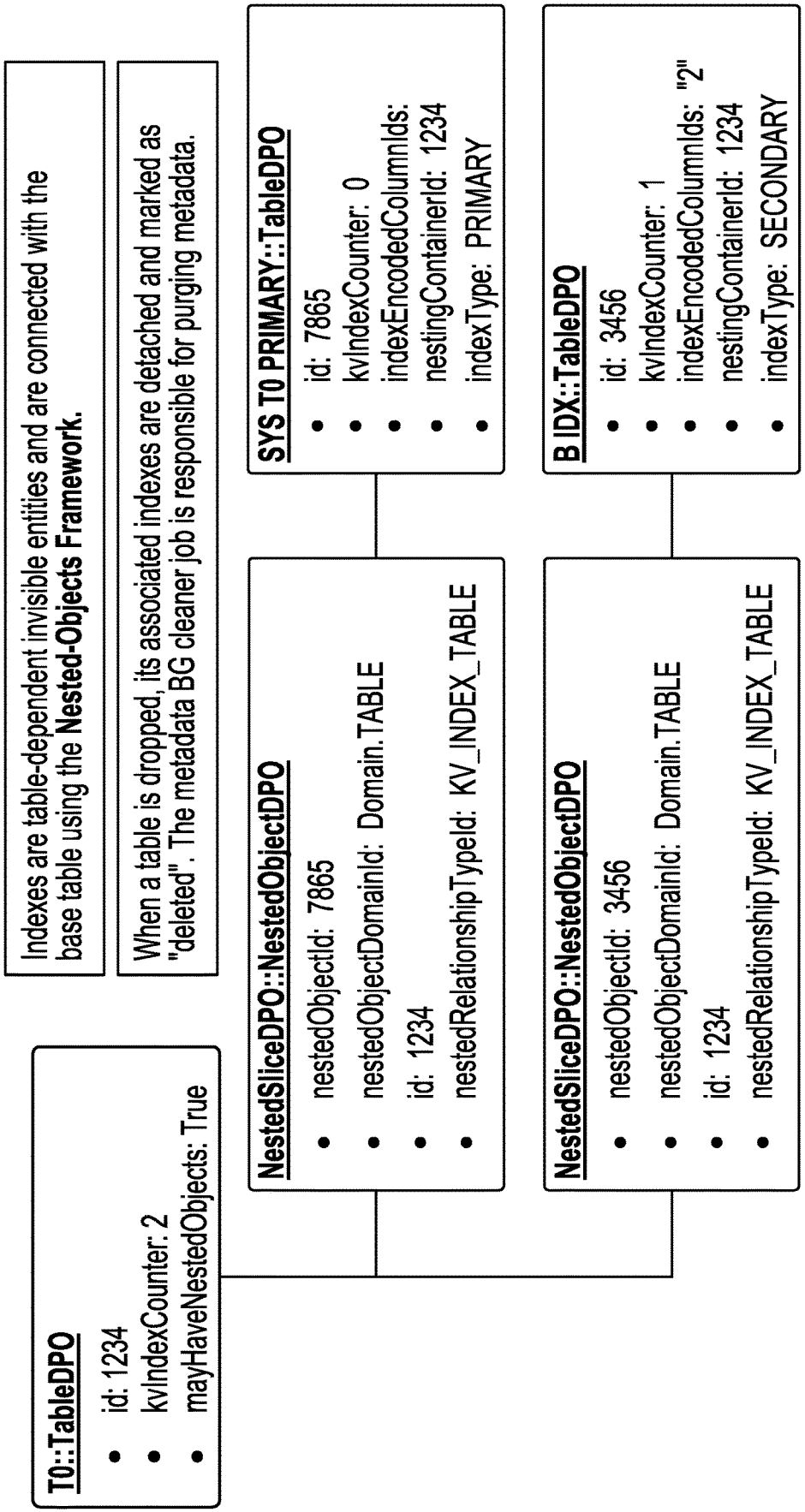
FIG. 11 shows an example nested data structure, in accordance with some embodiments of the present disclosure.

FIG. 11 shows example nested metadata 1150 implemented by the hybrid system 230, in accordance with some example embodiments. In the example of FIG. 11, the indexes are table-dependent invisible entities and are connected with the base table using a nested-object framework of the network-based database system 102, in accordance with some example embodiments. As an example, when a table is dropped, the indexes associated with the table are detached and marked as deleted. In some example embodiments, a metadata cleaner task in the hybrid system 230 is configured for purging the deleted metadata.

Secondary Indices Implementation

The main data layout for key-value tables today is the primary index stored natively in FDB. In order to improve the performance of DMLs and to support logical database constraints (e.g. UNIQUE), secondary indices are introduced for key-value tables. Compared to a primary index, which stores all the columns of a key-value table, a row of a secondary index does not contain by default all the columns of a table. At a minimum, it includes the values of the indexed columns as well as the values of the associated primary key columns. Other database systems (e.g. Postgres) will allow additional columns to be included in a secondary index (such indexes are often called "covering indexes), thus allowing certain queries to be answered directly through the secondary index without requiring any additional lookups to the primary index.

With the advent of hybrid tables, key-value tables, including their indices, are stored in two places: a) natively in FDB, b) in Hybrid storage backed by S3 (or any other cloud storage). All table changes are initially applied to FDB and then asynchronously replicated to Hybrid storage. Queries can retrieve rows from either of these representations with the exact same transactional semantics. The decision of where to retrieve data from is transparent to the user and is made by the planner (e.g., compute service manager 108 or component thereof) based on the properties of a statement.

Compaction for Hybrid Indexes

The compaction process appears in two forms: dedicated and online. Dedicated compaction takes place when the compaction DDL is submitted by the KV BG tasks (i.e., ALTER TABLE: table COMPACT HYBRID TABLE); Online compaction takes place when records are scanned during query execution, and it is an internal process of the transaction manager 440. Both forms are best-effort. In an implementation, the dedicated compactor process is extended, as online compaction occurs automatically.

Compaction Algorithm:

The dedicated compaction algorithm for indexes takes place when dedicated table compaction is submitted. After the base table is compacted, its indexes will be compacted serially.

Compaction Failure Resiliency

Dedicated compaction will not roll-back any work done if at any point during the compaction process an error occurs. For example, if there is a table FOO with 3 indexes: IDX1, IDX2, and IDX3. The steps in the dedicated compaction process will be the following: (1.) Compact table FOO. (2.) Compact index IDX1. (3.) Compact index IDX2. (4.) Compact index IDX3. In some example embodiments, if an error occurs at step 3 (IDX2 compaction), the compaction work completed in steps 1 and 2 will not be rolled back. A benefit of this failure model is that completed work is not undone. However, it might lead to some indexes not being compacted. The latter can be mitigated by the online compaction.

The following discussion relates to example processes performed by components of network-based database system 102.

Figure 12:
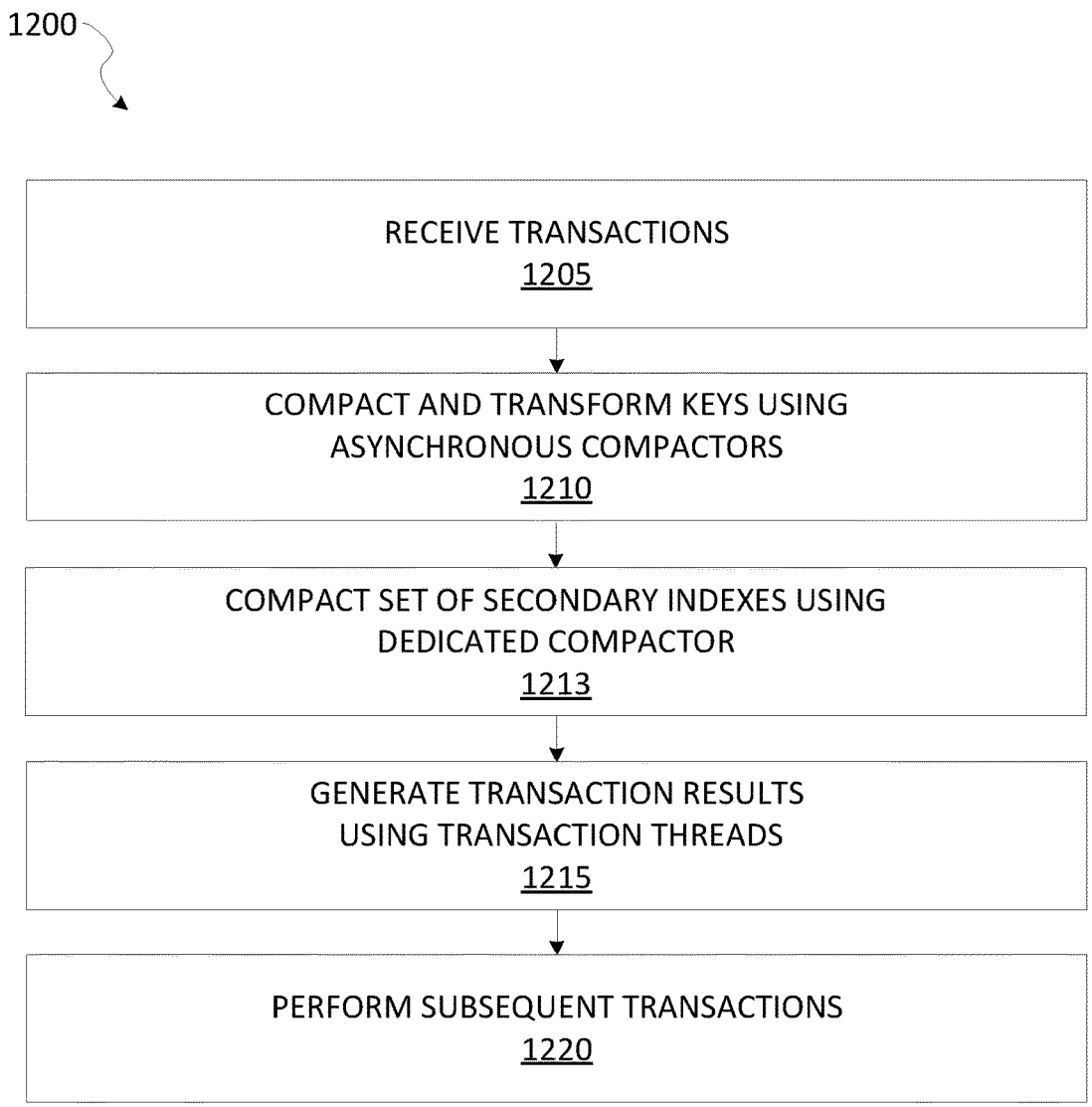
FIG. 12 is a flow diagram illustrating operations of a database system in performing a method, in accordance with some embodiments of the present disclosure.

FIG. 12 shows a flow diagram of a method 1200 for performing compaction in a database, according to some example embodiments.

At operation 1205, a database system receives transactions. For example, the transactions are received from jobs 410 and processed using the transaction manager 440 using one or more execution nodes (e.g., XP nodes).

At operation 1210, one or more asynchronous compactors in execution nodes transform the keys in batches and purges the old keys. For example, by replacing the transaction ID with a commit timestamp for each key in a batch, and deletes the old keys in the transaction ID format, across all asynchronous compactor execution nodes in parallel.

At operation 1213, one or more asynchronous compactors in execution nodes perform compaction of a set of secondary indexes. The set of secondary indexes, in an example, are child tables (e.g., nested objects) of tables (e.g., table objects representing base tables) associated with the keys from operation 1210. In an example, this is performed by transforming the keys of the set of secondary indexes in batches and purges the old keys. For example, by replacing the transaction ID with a commit timestamp for each key in a batch, and deletes the old keys in the transaction ID format, across all asynchronous compactor execution nodes in parallel.

At operation 1215, the transaction results (e.g., reads or writes) are completed using separate transaction threads that are not affected by asynchronous compaction threads. For example, a user's query thread of a node may complete (e.g., read and return data, write data) before or after the asynchronous compaction thread of the node is complete.

At operation 1220, subsequent transactions of new queries are received and performed by transaction manager 440. For example, the new queries can be more efficiently performed by reading the commit status directly from the query (e.g., embedded commit timestamp in the transformed key). In some example embodiments, each query plan of the new queries is configured to use the commit timestamp in the key, instead of requesting data from the status table. For instance, the query is still constructed by the querying user in the same way (e.g., same query statements as when the key is in the Txn ID format and the TST must be checked), but the execution handling of the query is modified to read all the key value pairs for a user case, determine whether any of the keys contains a commit timestamp, and use the commit timestamp for the query, instead of checking the TST. In some example embodiments, if a key contains two commitTs, the transaction manager 440 selects one for the current commit timestamp (e.g., more recent commitT). In some example embodiments, the execution handling of the compaction manager 470 implements Read Committed isolation level, in which each query can only access data committed before the query began (not the transaction began). For example, where:

1. T1 insert a key value pair <k1, v1> and committed at s1;
2. T2 update this pair to <k1, v2> and committed at s2;
3. T3 update this pair to <k1, v3> and committed at s4; and also where,
4. Another transaction T4 started at s3, and try to read k1's value, then, in some example embodiments, the execution handling checks the transaction's commitT values and returns v2 for the T4 transaction.

Figure 13:
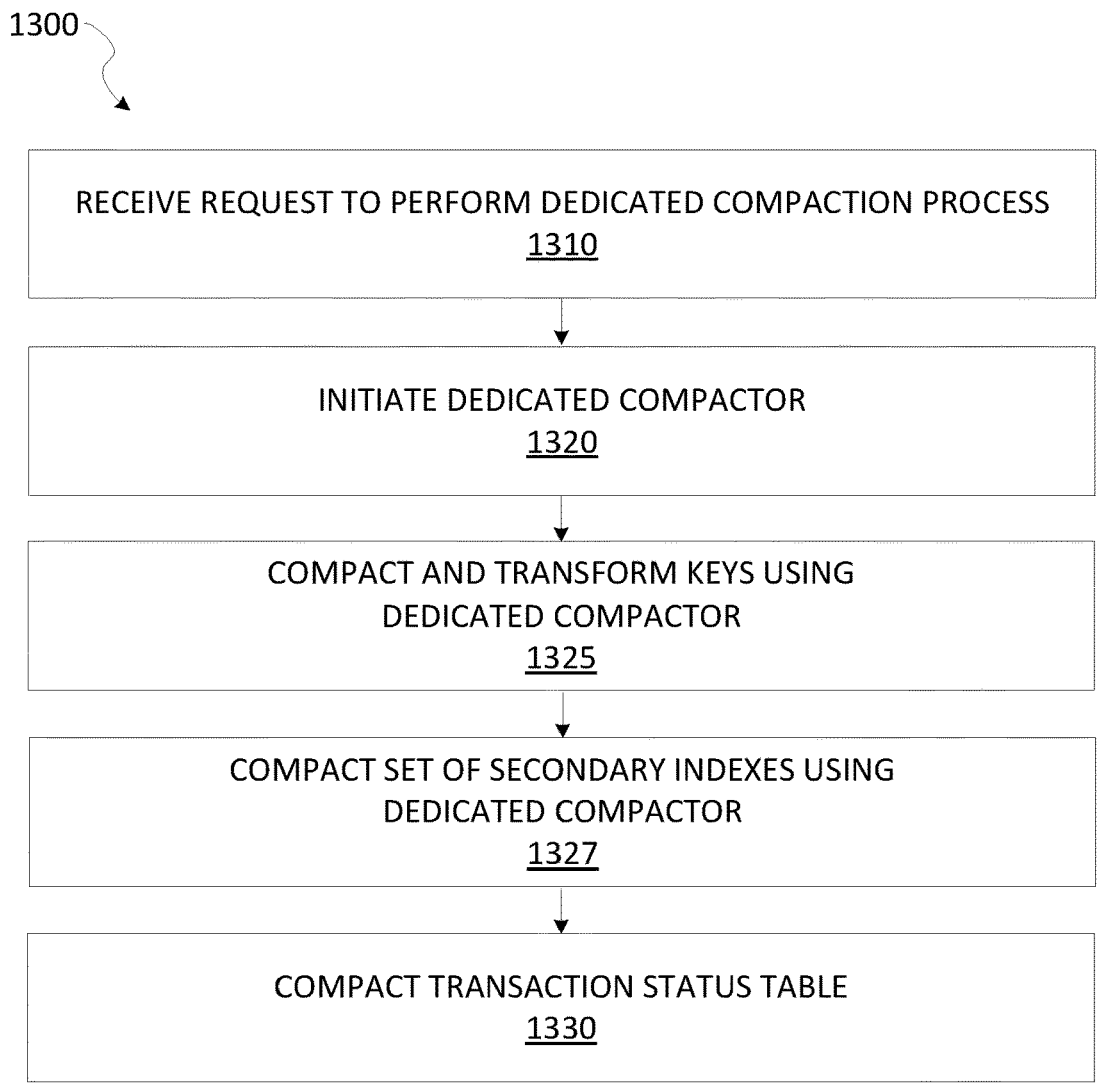
FIG. 13 is a flow diagram illustrating operations of a database system in performing a method, in accordance with some embodiments of the present disclosure.

FIG. 13 shows a flow diagram of a method 1300 for performing compaction in a database, according to some example embodiments.

At operation 1310, compaction manager 810 receives a request to perform a dedicated compaction process. As mentioned above, dedicated compaction takes place when the compaction DDL is submitted by the KV BG tasks (i.e., ALTER TABLE: table COMPACT HYBRID TABLE).

At operation 1320, the dedicated compactor 840 is initiated in response to the request.

At operation 1325, the dedicated compactor 840 performs compaction of keys by transforming and purging the keys. For example, the dedicated compactor 840 rewrites the keys to commit timestamp embedded format and deletes the original keys with the transaction IDs.

At operation 1327, the dedicated compactor 840 performs compaction of a second set of secondary indexes by transforming and purging keys associated with the second set of secondary indexes. For example, the dedicated compactor 840 rewrites the keys to commit timestamp embedded format and deletes the original keys with the transaction IDs.

As mentioned before, in an implementation, the dedicated compactor 840 will not roll-back any work done if at any point during the compaction process an error occurs. For example, if there is a table FOO with 3 indexes: IDX1, IDX2, and IDX3. The steps in the dedicated compaction process will be the following: (1.) Compact table FOO. (2.) Compact index IDX1. (3.) Compact index IDX2. (4.) Compact index IDX3. In some example embodiments, if an error occurs at step 3 (IDX2 compaction), the compaction work completed in steps 1 and 2 will not be rolled back. A benefit of this failure model is that completed work is not undone.

At operation 1330, the dedicated compactor 840 compacts the transaction status table. For example, the dedicated compactor 840 calls a transaction status table compaction function that purges, from the TST, keys that have been rewritten (e.g., rewritten by the async compactor 820 and async compactor 830, rewritten by the dedicated compactor 840). For example, as the commit timestamp is in the key, the TST no longer needs to store the corresponding transaction ID for the transaction. As such, the batches of transactions in the TST can be purged and the TST can thereby be significantly compacted.

Figure 14:
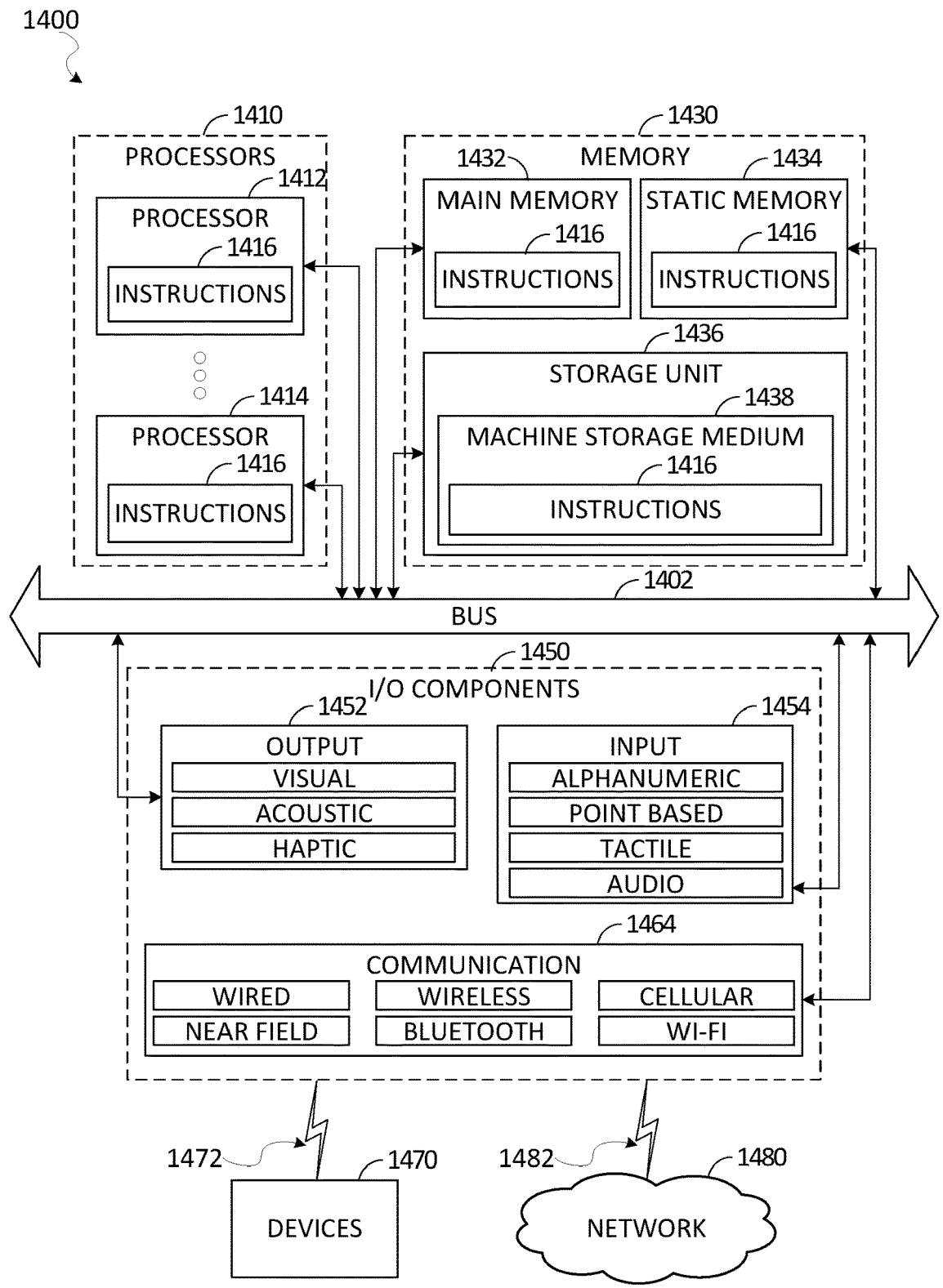
FIG. 14 illustrates a diagrammatic representation of a machine in the form of a computer system within which a set of instructions may be executed for causing the machine to perform any one or more of the methodologies discussed herein, in accordance with some embodiments of the present disclosure.

FIG. 14 illustrates a diagrammatic representation of a machine 1400 in the form of a computer system within which a set of instructions may be executed for causing the machine 1400 to perform any one or more of the methodologies discussed herein, according to an example embodiment. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein may be executed. For example, the instructions 1416 may cause the machine 1400 to execute any one or more operations of the methods described herein. As another example, the instructions 1416 may cause the machine 1400 to implement portions of the data flows described herein. In this way, the instructions 1416 transform a general, non-programmed machine into a particular machine 1400 (e.g., the compute service manager 108 or a node in the execution platform 110) that is specially configured to carry out any one of the described and illustrated functions in the manner described herein.

In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines 1400 that individually or jointly execute the instructions 1416 to perform any one or more of the methodologies discussed herein.

The machine 1400 includes processors 1410, memory 1430, and input/output (I/O) components 1450 configured to communicate with each other such as via a bus 1402. In an example embodiment, the processors 1410 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1412 and a processor 1414 that may execute the instructions 1416. The term "processor" is intended to include multi-core processors 1410 that may comprise two or more independent processors (sometimes referred to as "cores") that may execute instructions 1416 contemporaneously. Although FIG. 14 shows multiple processors 1410, the machine 1400 may include a single processor with a single core, a single processor with multiple cores (e.g., a multi-core processor), multiple processors with a single core, multiple processors with multiple cores, or any combination thereof.

The memory 1430 may include a main memory 1432, a static memory 1434, and a storage unit 1436, all accessible to the processors 1410 such as via the bus 1402. The main memory 1432, the static memory 1434, and the storage unit 1436 store the instructions 1416 embodying any one or more of the methodologies or functions described herein. The instructions 1416 may also reside, completely or partially, within the main memory 1432, within the static memory 1434, within machine storage medium 1438 of the storage unit 1436, within at least one of the processors 1410 (e.g., within the processor's cache memory), or any suitable combination thereof, during execution thereof by the machine 1400.

The I/O components 1450 include components to receive input, provide output, produce output, transmit information, exchange information, capture measurements, and so on. The specific I/O components 1450 that are included in a particular machine 1400 will depend on the type of machine. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functionality merely for simplifying the following discussion and the grouping is in no way limiting. In various example embodiments, the I/O components 1450 may include output components 1452 and input components 1454. The output components 1452 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1450 may include communication components 1464 operable to couple the machine 1400 to a network 1480 or devices 1470 via a coupling 1482 and a coupling 1472, respectively. For example, the communication components 1464 may include a network interface component or another suitable device to interface with the network 1480. In further examples, the communication components 1464 may include wired communication components, wireless communication components, cellular communication components, and other communication components to provide communication via other modalities. The devices 1470 may be another machine or any of a wide variety of peripheral devices (e.g., a peripheral device coupled via a universal serial bus (USB)). For example, as noted above, the machine 1400 may correspond to any one of the compute service manager 108 or the execution platform 110, and the devices 1470 may include the client device 114 or any other computing device described herein as being in communication with the network-based database system 102 or the cloud storage platform 104.

The various memories (e.g., 1430, 1432, 1434, and/or memory of the processor(s) 1410 and/or the storage unit 1436) may store one or more sets of instructions 1416 and data structures (e.g., software) embodying or utilized by any one or more of the methodologies or functions described herein. These instructions 1416, when executed by the processor(s) 1410, cause various operations to implement the disclosed embodiments.

As used herein, the terms "machine-storage medium," "device-storage medium," and "computer-storage medium" mean the same thing and may be used interchangeably in this disclosure. The terms refer to a single or multiple non-transitory storage devices and/or non-transitory media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1480 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1480 or a portion of the network 1480 may include a wireless or cellular network, and the coupling 1482 may be a Code Division Multiple Access (CDMA) connection, a Global System for Mobile communications (GSM) connection, or another type of cellular or wireless coupling. In this example, the coupling 1482 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1416 may be transmitted or received over the network 1480 using a transmission medium via a network interface device (e.g., a network interface component included in the communication components 1464) and utilizing any one of a number of well-known transfer protocols (e.g., hypertext transfer protocol (HTTP)). Similarly, the instructions 1416 may be transmitted or received using a transmission medium via the coupling 1472 (e.g., a peer-to-peer coupling) to the devices 1470. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1416 for execution by the machine 1400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the method 500 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A method comprising:
    receiving, by a distributed database, a plurality of transactional queries against a key-value database comprising data managed by key-value pairs;
    performing, using asynchronous threads of execution nodes of the distributed database, asynchronous transformation and compaction of key-value pairs of data that corresponds to the plurality of transactional queries, the asynchronous threads transforming the key-value pairs from an initial format to a commit format that includes a commit time of data committed to the distributed database, the asynchronous threads compacting the key-value pairs by deleting the key-value pairs in the initial format;
    performing, using asynchronous threads of execution nodes of the distributed database, asynchronous transformation and compaction of a set of secondary indexes that corresponds to the plurality of transactional queries;
    processing, using transactional threads in the execution nodes, the plurality of transactional queries to generate results data, the asynchronous threads performing the asynchronous transformation and compaction while the transactional threads generate the results data; and
    storing the results data.

2. The method of claim 1, further comprising:
    receiving a plurality of additional transactional queries against the distributed database.

3. The method of claim 2, further comprising:
    processing, by the transactional threads, the plurality of additional transactional queries using the key-value pairs in the commit format, the transactional threads using commit times in the key-value pairs to generate additional results data; and storing the additional results data.

4. The method of claim 1, wherein the distributed database comprises a transaction status table that indicates whether data of transactions has committed to the distributed database.

5. The method of claim 4, wherein queries for data having key-value pairs in the initial format are executed by identifying transaction identifiers in the key-value pairs and access the transaction status table to determine commit statuses.

6. The method of claim 4, further comprising:
performing, using a dedicated compactor thread in one of the execution nodes, transformation and compaction of a second set of key-value pairs from the initial format to the commit format.

7. The method of claim 6, further comprising:
performing, using the dedicated compactor thread, compaction of the transaction status table by deleting particular key-value pairs in the transaction status table that have corresponding key-value pairs in the commit format.

8. The method of claim 6, further comprising:
performing, using the dedicated compactor thread, compaction of a second set of secondary indexes associated with a set of tables corresponding to the second set of key-value pairs.

9. The method of claim 1, wherein each key-value pair in the initial format includes a transaction identifier value, wherein the asynchronous threads perform transformation by rewriting each key-value pair such that the commit time replaces the transaction identifier value.

10. The method of claim 1, wherein the key-value pairs having transaction identifiers are deleted by the asynchronous threads.

11. A system comprising:
one or more processors of a machine; and
a memory storing instructions that, when executed by the one or more processors, cause the machine to perform operations comprising:
receiving, by a distributed database, a plurality of transactional queries against a key-value database comprising data managed by key-value pairs;
performing, using asynchronous threads of execution nodes of the distributed database, asynchronous transformation and compaction of key-value pairs of data that corresponds to the plurality of transactional queries, the asynchronous threads transforming the key-value pairs from an initial format to a commit format that includes a commit time of data committed to the distributed database, the asynchronous threads compacting the key-value pairs by deleting the key-value pairs in the initial format;
performing, using asynchronous threads of execution nodes of the distributed database, asynchronous transformation and compaction of a set of secondary indexes that corresponds to the plurality of transactional queries;
processing, using transactional threads in the execution nodes, the plurality of transactional queries to generate results data, the asynchronous threads performing the asynchronous transformation and compaction while the transactional threads generate the results data; and
storing the results data.

12. The system of claim 11, wherein the operations further comprise:
receiving a plurality of additional transactional queries against the distributed database.

13. The system of claim 12, wherein the operations further comprise:
processing, by the transactional threads, the plurality of additional transactional queries using the key-value pairs in the commit format, the transactional threads using commit times in the key-value pairs to generate additional results data; and
storing the additional results data.

14. The system of claim 11, wherein the distributed database comprises a transaction status table that indicates whether data of transactions has committed to the distributed database.

15. The system of claim 14, wherein queries for data having key-value pairs in the initial format are executed by identifying transaction identifiers in the key-value pairs and access the transaction status table to determine commit statuses.

16. The system of claim 14, wherein the operations further comprise:
performing, using a dedicated compactor thread in one of the execution nodes, transformation and compaction of a second set of key-value pairs from the initial format to the commit format.

17. The system of claim 16, wherein the operations further comprise:
performing, using the dedicated compactor thread, compaction of the transaction status table by deleting particular key-value pairs in the transaction status table that have corresponding key-value pairs in the commit format.

18. The system of claim 16, wherein the operations further comprise:
performing, using the dedicated compactor thread, compaction of a second set of secondary indexes associated with a set of tables corresponding to the second set of key-value pairs.

19. The system of claim 11, wherein each key-value pair in the initial format includes a transaction identifier value, wherein the asynchronous threads perform transformation by rewriting each key-value pair such that the commit time replaces the transaction identifier value.

20. The system of claim 11, wherein the key-value pairs having transaction identifiers are deleted by the asynchronous threads.

21. A non-transitory computer-storage medium storing instructions that, when executed by one or more processors of a machine, configure the machine to perform operations comprising:
receiving, by a distributed database, a plurality of transactional queries against a key-value database comprising data managed by key-value pairs;
performing, using asynchronous threads of execution nodes of the distributed database, asynchronous transformation and compaction of key-value pairs of data that corresponds to the plurality of transactional queries, the asynchronous threads transforming the key-value pairs from an initial format to a commit format that includes a commit time of data committed to the distributed database, the asynchronous threads compacting the key-value pairs by deleting the key-value pairs in the initial format;
performing, using asynchronous threads of execution nodes of the distributed database, asynchronous transformation and compaction of a set of secondary indexes that corresponds to the plurality of transactional queries;

processing, using transactional threads in the execution nodes, the plurality of transactional queries to generate results data, the asynchronous threads performing the asynchronous transformation and compaction while the transactional threads generate the results data; and storing the results data.

22. The non-transitory computer-storage medium of claim 21, wherein the operations further comprise: receiving a plurality of additional transactional queries against the distributed database.

23. The non-transitory computer-storage medium of claim 22, wherein the operations further comprise: processing, by the transactional threads, the plurality of additional transactional queries using the key-value pairs in the commit format, the transactional threads using commit times in the key-value pairs to generate additional results data; and storing the additional results data.

24. The non-transitory computer-storage medium of claim 21, wherein the distributed database comprises a transaction status table that indicates whether data of transactions has committed to the distributed database.

25. The non-transitory computer-storage medium of claim 24, wherein queries for data having key-value pairs in the initial format are executed by identifying transaction identifiers in the key-value pairs and access the transaction status table to determine commit statuses.

26. The non-transitory computer-storage medium of claim 24, wherein the operations further comprise: performing, using a dedicated compactor thread in one of the execution nodes, transformation and compaction of a second set of key-value pairs from the initial format to the commit format.

27. The non-transitory computer-storage medium of claim 26, wherein the operations further comprise: performing, using the dedicated compactor thread, compaction of the transaction status table by deleting particular key-value pairs in the transaction status table that have corresponding key-value pairs in the commit format.

28. The non-transitory computer-storage medium of claim 26, wherein the operations further comprise: performing, using the dedicated compactor thread, compaction of a second set of secondary indexes associated with a set of tables corresponding to the second set of key-value pairs.

29. The non-transitory computer-storage medium of claim 21, wherein each key-value pair in the initial format includes a transaction identifier value, wherein the asynchronous threads perform transformation by rewriting each key-value pair such that the commit time replaces the transaction identifier value.

30. The non-transitory computer-storage medium of claim 21, wherein the key-value pairs having transaction identifiers are deleted by the asynchronous threads.

* * * * *